(12) United States Patent
Clark et al.

(10) Patent No.: US 7,358,733 B2
(45) Date of Patent: Apr. 15, 2008

(54) HIGH PERFORMANCE SECURITY INSPECTION SYSTEM WITH PHYSICALLY ISOLATED DETECTION SENSORS

(75) Inventors: Keith A. Clark, La Mesa, CA (US); David E. Kresse, Walnut Creek, CA (US); Brad Moyer, San Diego, CA (US)

(73) Assignee: GE Security, Inc., Bradenton, FL (US)

( * ) Notice: Subject to any disclaimer, the term of this patent is extended or adjusted under 35 U.S.C. 154(b) by 0 days.

(21) Appl. No.: 11/363,654

(22) Filed: Feb. 28, 2006

(65) Prior Publication Data

US 2007/0200566 A1    Aug. 30, 2007

(51) Int. Cl.
*G01V 3/00* (2006.01)
(52) U.S. Cl. .................................................... 324/318
(58) Field of Classification Search ................. 324/318
See application file for complete search history.

(56) References Cited

U.S. PATENT DOCUMENTS

| | | | | |
|---|---|---|---|---|
| 4,251,726 A | * | 2/1981 | Alvarez ....................... 376/159 |
| 4,357,535 A | * | 11/1982 | Haas ........................... 378/57 |
| 5,274,356 A | * | 12/1993 | Taricco ....................... 340/515 |
| 5,668,342 A | * | 9/1997 | Discher ......................... 86/50 |
| 6,018,562 A | * | 1/2000 | Willson .......................... 378/9 |
| 6,047,599 A | | 4/2000 | Krajec et al. |
| 6,173,662 B1 | * | 1/2001 | Donovan ..................... 110/237 |
| 6,194,898 B1 | * | 2/2001 | Magnuson et al. ......... 324/300 |
| 6,489,931 B2 | | 12/2002 | Liu |
| 6,501,017 B2 | | 12/2002 | Kaufman |
| 6,657,214 B1 | | 12/2003 | Foegelle et al. |
| 2004/0196043 A1 | | 10/2004 | Branch et al. |
| 2006/0278069 A1 | * | 12/2006 | Ryan .............................. 86/50 |
| 2007/0165777 A1 | * | 7/2007 | Anwar et al. .................. 378/57 |

OTHER PUBLICATIONS www.lindgrenrf.com/ind_tabletop.htm, ETS Lindgren, Table Model Enclosures, 2 pages, Nov. 17, 2004.

* cited by examiner

*Primary Examiner*—Brij Shrivastav
*Assistant Examiner*—Megann E Vaughn
(74) *Attorney, Agent, or Firm*—Eugene Hyun, Esq.; Armstrong Teasdale LLP

(57) ABSTRACT

An inspection system includes a housing having a cavity which defines an inspection zone, and a positioning device within the inspection zone which provides positioning of a specimen within the inspection zone. The inspection system includes a sensor system for inspecting the specimen, and an entrance aperture formed in the housing. The entrance aperture may be sized to permit the specimen to pass through the entrance aperture. The inspection system also includes a sealing mechanism, such as a door, which cooperates with the positioning device. The sealing mechanism is operatively coupled to the housing and selectively positionable between open and closed positions. The open position permits the specimen to pass through the entrance aperture, and the closed position seals the entrance aperture to effectively isolate the inspection system.

35 Claims, 20 Drawing Sheets

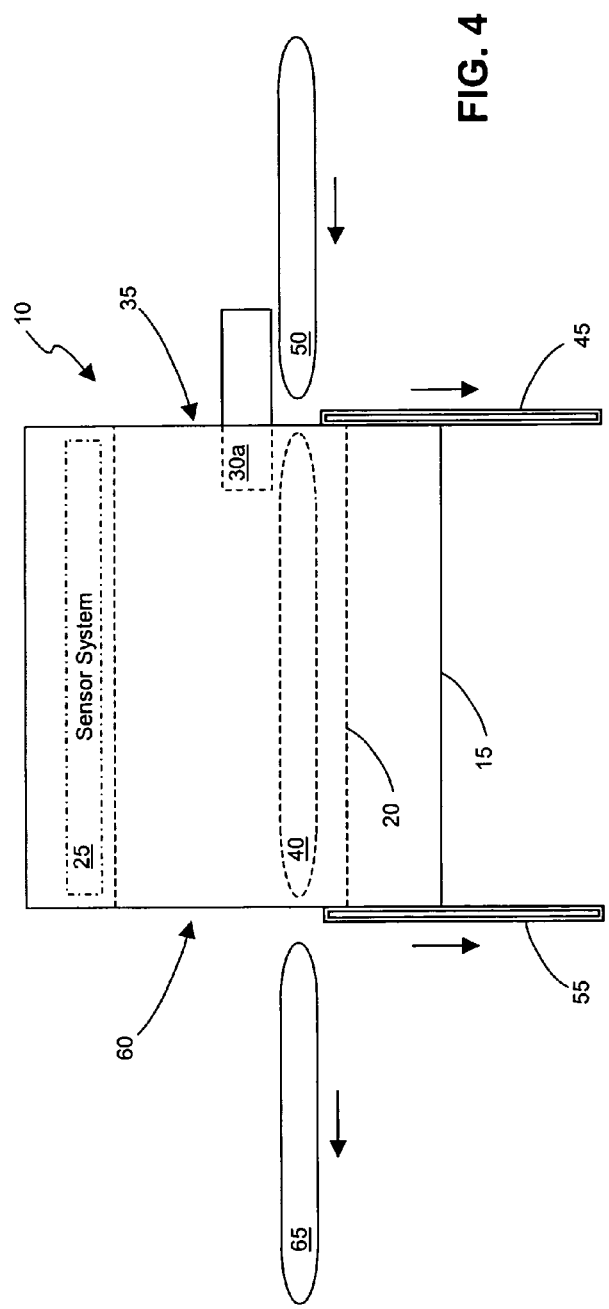
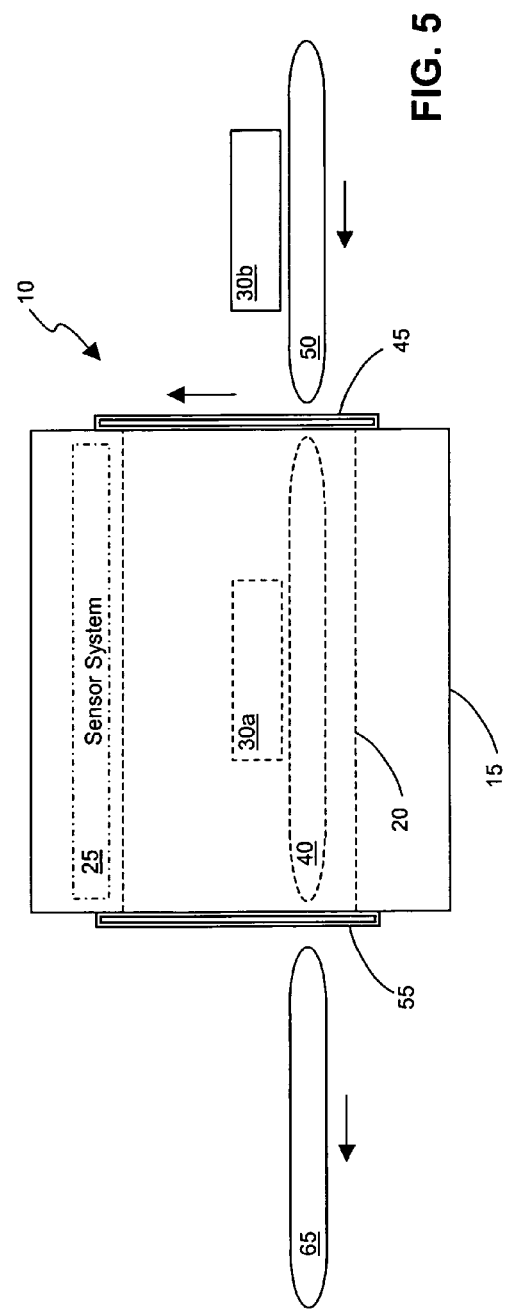

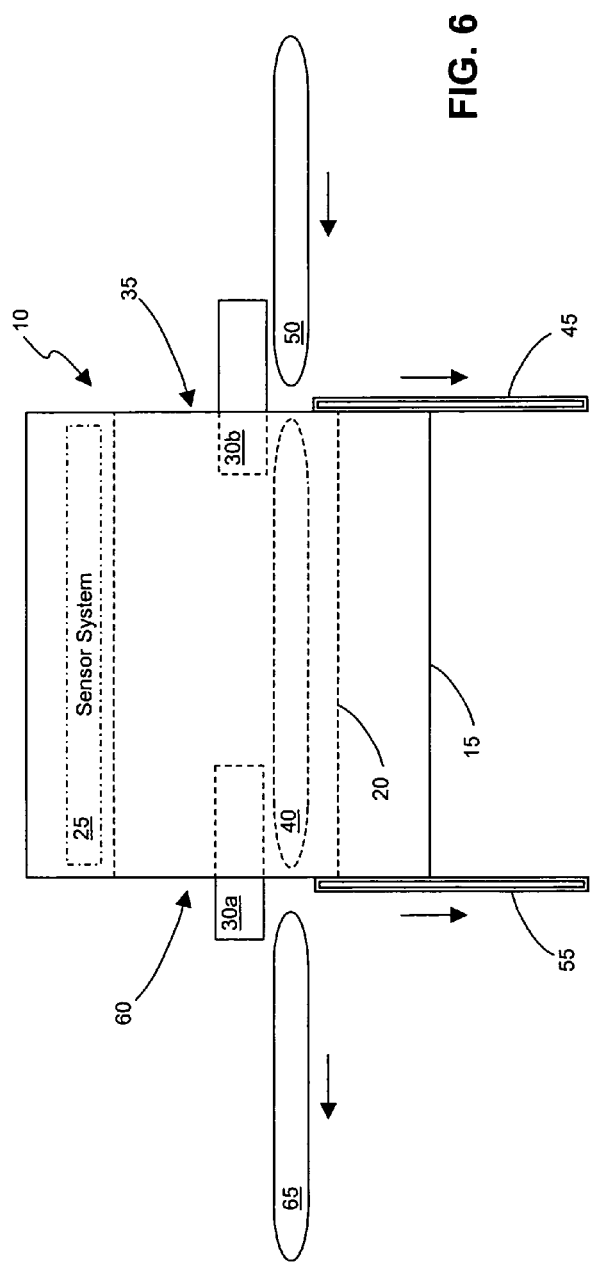
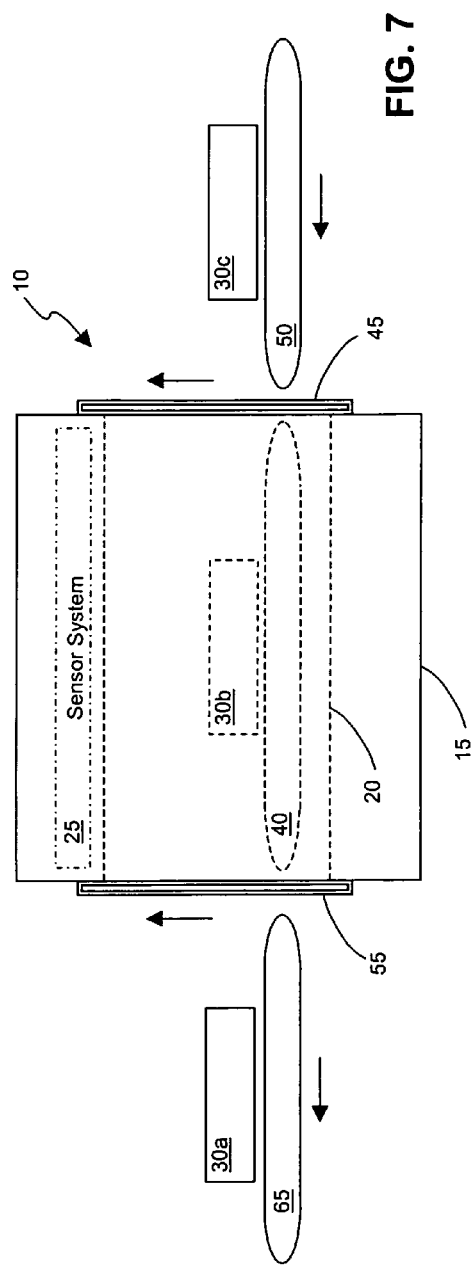

140

Selectively operating a positioning device located within a housing having a cavity which defines an inspection zone

142

Selectively operating a first sealing mechanism operatively coupled to the housing

144

Inspecting the specimen for an item of interest after the first sealing mechanism is in a closed position

FIG. 17

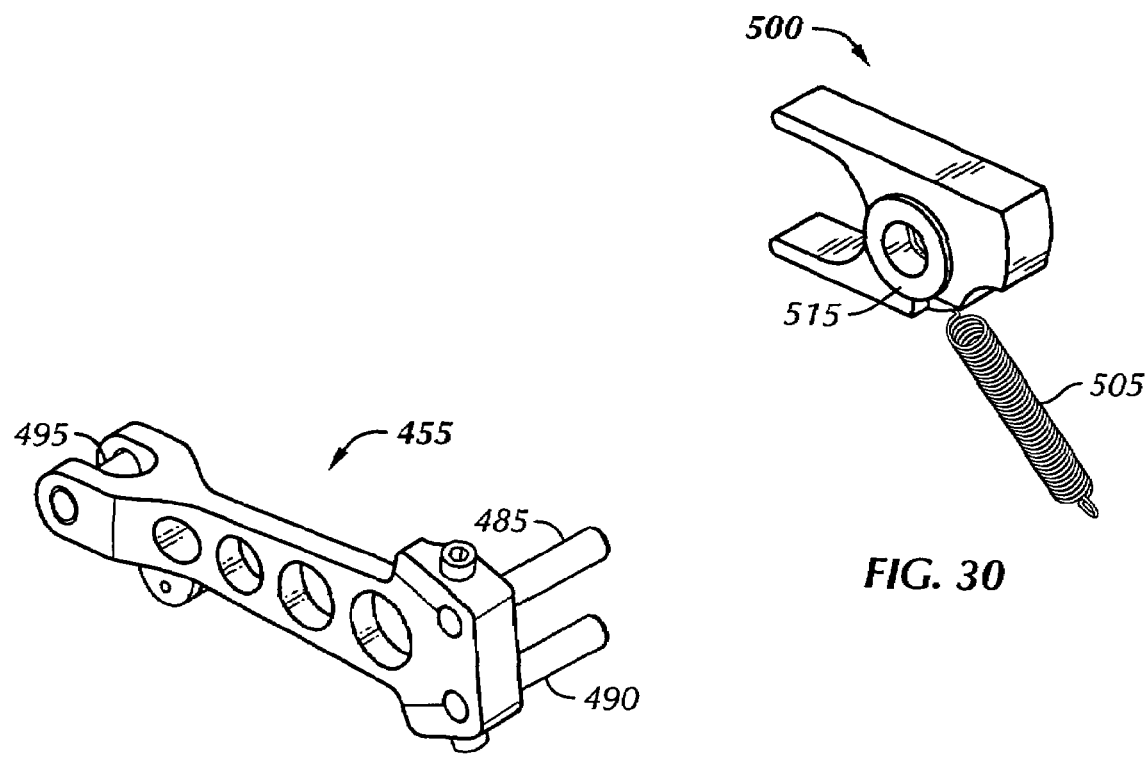
FIG. 30
FIG. 31
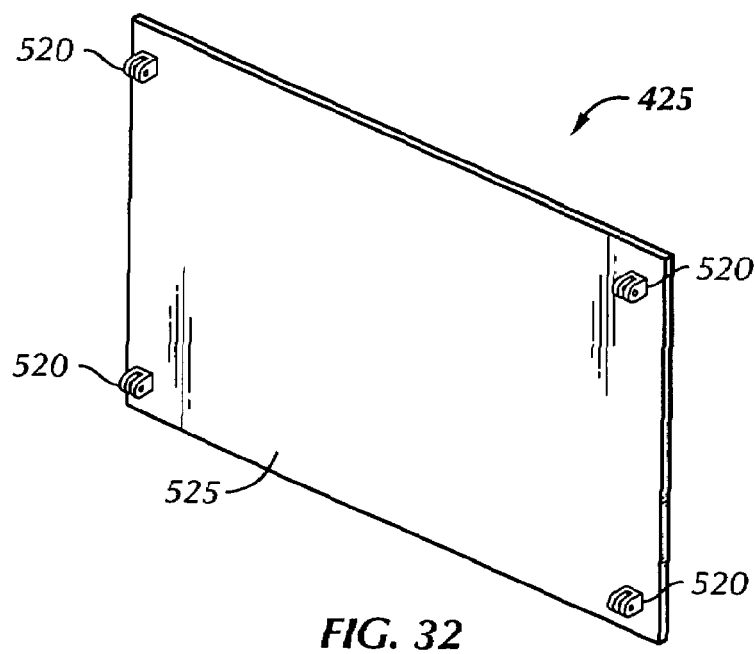
FIG. 32

HIGH PERFORMANCE SECURITY INSPECTION SYSTEM WITH PHYSICALLY ISOLATED DETECTION SENSORS

BACKGROUND OF THE INVENTION

1. Field of the Invention

Embodiments of the invention relate generally to a security inspection system, and in particular to an inspection system that provides physical isolation by mechanically, electromagneticly, and radiologically isolating sensor technologies, from each other, and the outside world to produce a system with a unique and novel performance capability.

2. Discussion of the Related Art

A number of different inspection and detection systems have been developed for screening items such as passenger baggage, checked baggage, packages, cargo, vehicles and the like. These items may be screened for explosives, weapons, drugs, contraband, threat objects, and other items of interest. Conventional inspection systems operate using a variety of different technologies including nuclear quadrupolar resonance (NQR), X-ray computed tomography (CT), nuclear magnetic resonance (NMR), and magnetic resonance imaging (MRI), among others. Regardless of which technology the inspection system utilizes, the system typically contains some type of sensor system. High performance is achieved when each sensor is effectively isolated from other areas of the system, and the outside world. This isolation is necessary to optimize the inspection process to provide a high probability of detection and a low probability of false alarm, and to protect the outside environment from potentially harmful effects such as electromagnetic interference and ionizing radiation.

For example, in a typical NQR inspection system, a conveyor transports baggage into an inspection chamber defined by a radio frequency (RF) coil. Once positioned within the RF coil, the baggage is typically irradiated with pulses or sequences of pulses of electromagnetic radiation. For proper operation, a conventional NQR inspection system requires a structure, or active subsystem, in order to provide the necessary electromagnetic interference/radio frequency interference (EMI/RF) shielding from external noise. A tunnel, commonly known as a "wave guide below cut-off," is often utilized to provide the necessary RFI shielding. In general, the length of the tunnel is about the same as the maximum cross-sectional dimension of the inspection chamber.

Inspection systems employing conveyers often utilize two such tunnels. One tunnel is located at the entrance to the inspection chamber, and a second tunnel is located at the exit. The length of each tunnel of a typical passenger baggage inspection system may range from about 24-48 inches, or more. The two shielding tunnels can double the overall size of the inspection system. In many applications, the size of the inspection system is not particularly important. However, there has been recent interest in utilizing increased numbers of inspection systems within existing environments such as airports and seaports. In such environments, space is limited and an inspection system having reduced overall size is highly desirable.

SUMMARY OF THE INVENTION

Embodiments include an inspection system including a housing having a cavity which defines an inspection zone, and a positioning device within the inspection zone which provides positioning of a specimen within the inspection zone. The inspection system may also include a sensor system for inspecting the specimen, and an entrance aperture formed in the housing. The entrance aperture may be sized to permit the specimen to pass through the entrance aperture. The inspection system also includes a sealing mechanism, such as a door, which cooperates with the positioning device. The sealing mechanism is operatively coupled to the housing and selectively positionable between open and closed positions. The open position permits the specimen to pass through the entrance aperture, and the closed position seals the entrance aperture to effectively isolate the inspection system.

Additional embodiments include a method for inspecting specimens. The method includes selectively operating a positioning device located within a housing having a cavity which defines an inspection zone; selectively operating a first sealing mechanism operatively coupled to the housing, the first sealing mechanism being selectively positionable between open and closed positions, the open position permitting a specimen to pass through an entrance aperture and to come into contact with the positioning device, and the closed position sealing the entrance aperture to effectively isolate the inspection system; and inspecting the specimen for an item of interest after the first sealing mechanism is positioned in the closed position.

Additional embodiments include a sealing mechanism for sealing an aperture. The sealing mechanism includes a flange with an interface defining an entrance aperture; a first drive shaft; a second drive shaft; and a drive source for driving the first drive shaft. Left and right drive elements are each separately connected to the first drive shaft and the second shaft. Left and right linear rails are each separately located on opposing sides of the entrance aperture. Left and right door linkages are each pivotally attached to a door, the left and right door linkages each being respectively received by the left and right linear rails and respectively connected to the left and right drive elements. Relative motion between the door and the entrance aperture is obtained by driving the left and right drive elements in one of two opposing directions. Pivoting left and right cams are each respectively attached to the left and right door linkages. Left and right cam latches are each located on opposing sides of the entrance aperture and sized to respectively receive the left and right cams. Respective contact between the left and right cam latches and the left and right cams cause the door to travel inwardly at an angle relative to the direction of travel of the door, causing the door to ultimately contact an outer edge of the entrance aperture.

BRIEF DESCRIPTION OF THE DRAWING

The above and other aspects, features, and advantages of embodiments of the invention will become more apparent upon consideration of the following description of preferred embodiments, taken in conjunction with the accompanying drawing figures, wherein:

FIGS. 4 through 7 are side views of the inspection system of FIGS. 1-3, and collectively show a generalized example of a baggage inspection process;

FIG. 17 is a flowchart showing exemplary operations for inspecting a specimen for an item of interest;

FIG. 30 is a close-up view of a cam which may be used in the upper control arm of FIG. 31;

FIG. 31 is a close-up view of an upper control arm which may be used as part of the door linkage shown in, for example, FIGS. 24 through 27; and FIG. 32 is a close-up view of a door which may be implemented by the closing mechanism shown in, for example, FIGS. 19 through 21.

DETAILED DESCRIPTION OF EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of embodiments of the invention.

Figure 1:
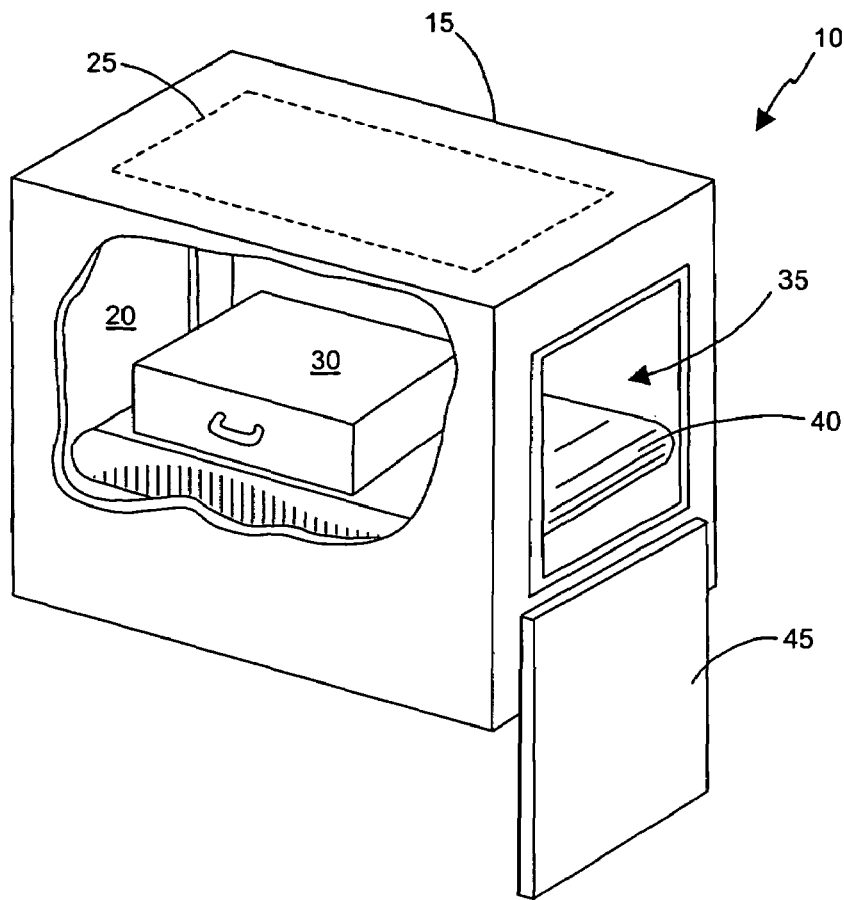
FIGS. 1 through 3 are perspective views of an inspection system in accordance with embodiments of the invention.

FIG. 1 is a perspective view of inspection system 10. Housing 15 contains a defined inspection zone 20 for which sensor system 25 can inspect baggage 30 for items of interest. The baggage may be introduced to the inspection zone via entrance aperture 35. The inspection system typically contains a device for positioning a specimen, such as baggage 30, within the inspection zone. In the embodiment of FIG. 1, conveyor 40 receives and positions the baggage within the inspection zone. An external conveyor (not shown in this figure), for example, may be used for introducing the baggage to the interior conveyor 40.

Figure 2:
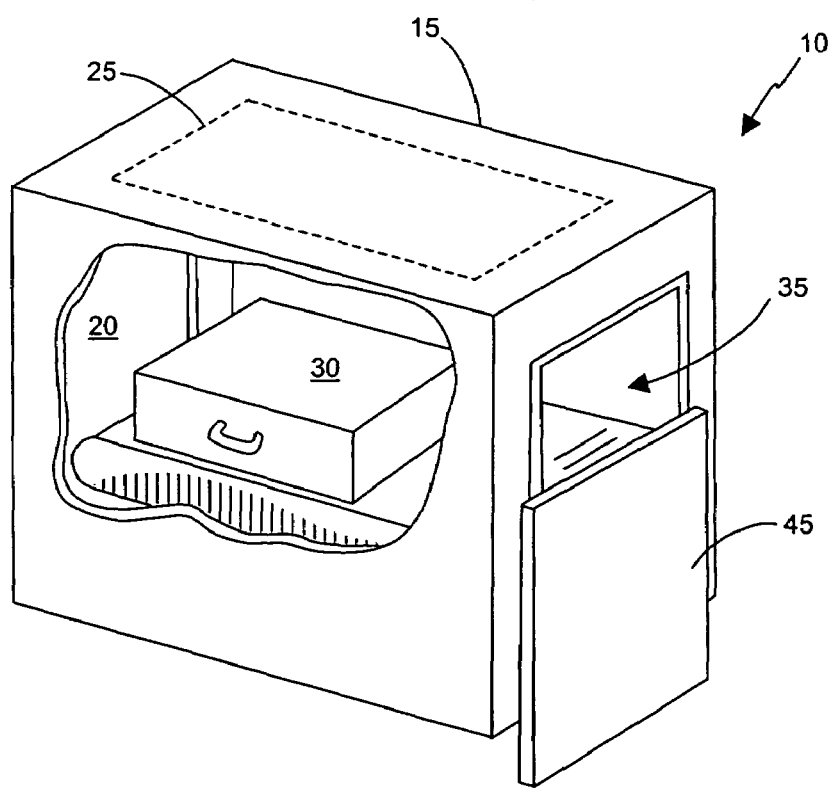
Figure 3:
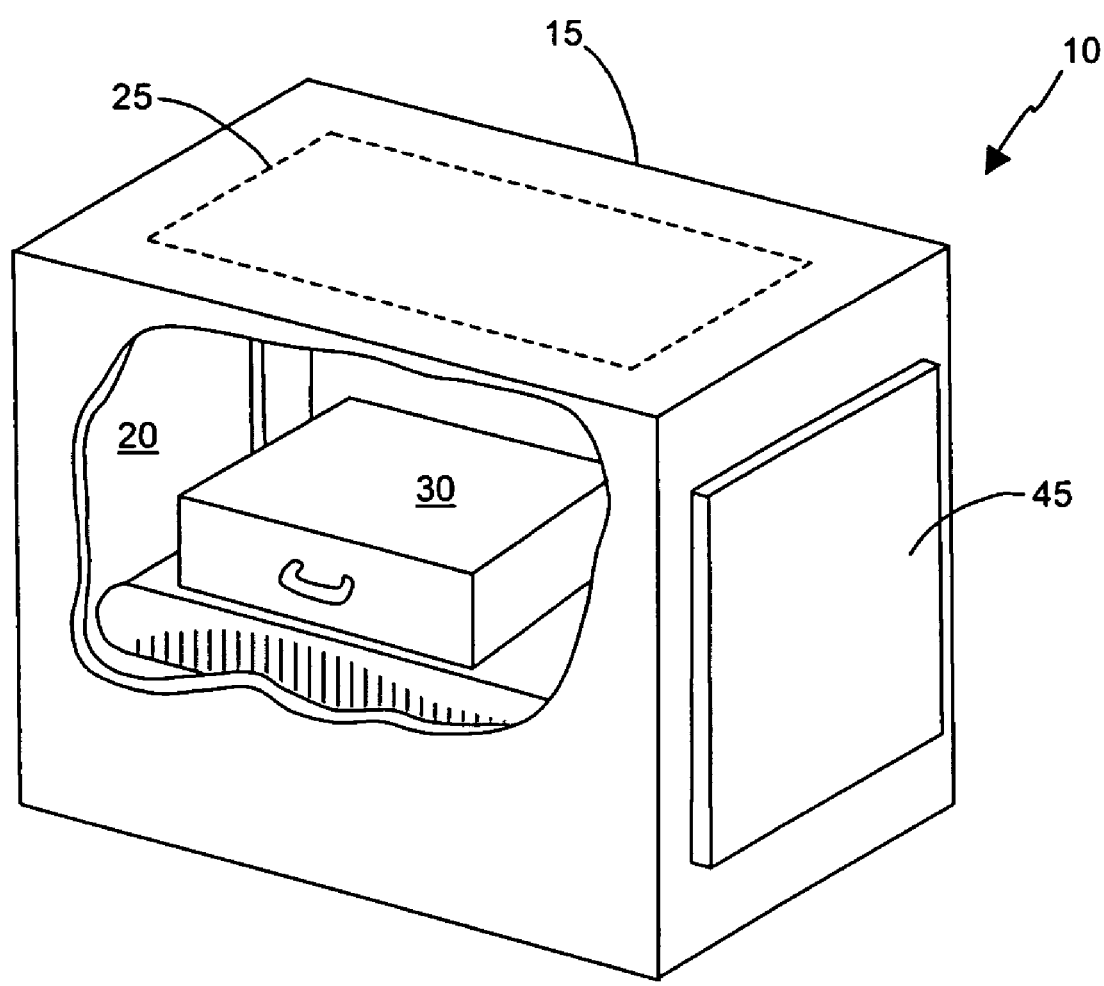

Entrance door 45 is shown operatively coupled to housing 15, and is selectively positionable, horizontally or vertically, relative to entrance aperture 35. In some embodiments, the entrance door is closed by vertically moving the door relative to the entrance aperture. In FIG. 1, the entrance door is in the open position. In FIG. 2, the entrance door has been moved vertically upward, and is in the partially closed position. FIG. 3 shows the entrance door in the fully closed position. Opening of the entrance door would essentially be the reverse of this process such that the door would be moved vertically downward from the position shown in FIG. 3 to the door position shown in FIG. 1. Inspection system 10 is also configured with an exit aperture and associated exit door. These components are not readily viewable in FIGS. 1 through 3, but they are shown in more detail in later figures. The exit door functions in a manner similar to entrance door 45.

Inspection system 10 includes sensor system 25, as identified above. As used herein, the term "sensor system" is used to refer to any type of spectroscopy or imaging system which is capable of inspecting a specimen, such as baggage 30. Particular examples of suitable sensor systems include those which implement one or more technologies such as nuclear quadrupolar resonance (NQR), nuclear magnetic resonance (NMR), magnetic resonance imaging (MRI), X-ray computed tomography (CT), projection X-ray, single-view X-ray sensor, multi-view X-ray sensor, smart X-ray, chemical trace detection, millimeter-wave (mm-wave) imaging, terahertz (THz) imaging, laminagraphy, and nuclear detection for detecting threshold levels of radioactive materials, among others. Specific items of interest for which a specimen may be inspected or otherwise interrogated by the sensor system include explosives, contraband, and illegal or controlled substances such as cocaine, heroin, and MDMA. An appropriately configured sensor system can detect a wide range of explosives such as those containing PETN, RDX, TNT, Tetryl, Ammonium Nitrate (AN), black powder, and the like. Non-destructive testing and analysis applications are also possible.

Inspection system 10 is shown with entrance and exit apertures, and corresponding entrance and exit doors, which are rectangular. However, other configurations (for example, circular, oval, triangular, etc.) are possible, and may be implemented using the teachings of the present disclosure.

FIGS. 4 through 7 are side views of inspection system 10, and collectively show a generalized example of a baggage inspection process. Separate baggage items which may be inspected by the system are represented by reference numerals 30a, 30b, and 30c. For simplicity, sensor system 25 is shown schematically as block 25. However, in practical applications, the sensor system may include a number of system components, each positioned at various locations within the inspection system.

FIG. 4 shows entrance door 45 and exit door 55 in the open position, exposing entrance aperture 35 and exit aperture 60, respectively. Conversely, FIG. 5 shows the entrance and exit doors after these structures have been moved into the closed position, effectively isolating the baggage within the inspection system.

One function of entrance and exit doors 45 and 55 is to provide a sealing mechanism which effectively isolates, during an inspection process, the sensor system and inspected baggage. The entrance and exit doors provide sensor system 25 with shielding from external interference. At the same time, these doors protect the outside environment by inhibiting the release of unwanted or undesirable artifacts (for example, electromagnetic interference (EMI)) generated by the sensor system operating within the inspection system. In general, the sealing mechanism of the inspection system provides, for example, one or more of: electromagnetic shielding, ionizing radiation isolation, atmospheric isolation, optical isolation, thermal isolation and control, and mechanical isolation, among others.

The type of material and specific structure of the entrance and exit doors is typically selected based upon the type of sensor system utilized, and the type of isolation desired (internal, external, or both). Each type of sensor system (for example, QR, CT, chemical trace) will typically have its own unique isolation requirement. As such, the structural requirements of housing 15 and the entrance and exit doors will vary depending upon the type of sensor system utilized within the inspection system.

For example, in one embodiment, sensor system 25 may be implemented using a conventional QR sheet coil or tube array coil system configured to detect the presence of explosives in baggage using nuclear quadrupole resonance (NQR). In such an embodiment, optimal isolation may be achieved by electrically connecting and grounding the housing which encloses the QR sensor system. This may be accomplished by forming entrance and exit doors from a material which electrically conductively isolates the housing and included components when these doors are closed. When closed, these doors provide a range of attenuation of anywhere from 70 dB to 120 dB, or higher. The entrance and exit doors may be hollow or solid structures. Alternatively, the doors may be partially hollow and contain support baffling or structures (for example, a honeycomb structure) to increase the structural integrity of the door. Typically, the surface of the door which contacts electrically conductive portions of the housing is formed from a conductive material such copper, aluminum, and the like.

In other embodiments, sensor system 25 is implemented using various types of projection X-ray systems. These embodiments will not require conductive isolation as does the just-described QR sensor. Instead, optimal isolation for the X-ray system may be achieved by effectively containing the X-rays emitted by the x-ray system. In such embodiments, entrance and exit doors 45 and 55 may be formed from any material which provides the necessary containment of the radiation generated by the X-ray system. Metals may be used for electromagnetic shielding (e.g., NQR, NMR, MRI, microwave, mmwave, THz) and include, but are not limited to, copper, gold, silver, nickel, etc. High-z materials may be used for radiological shielding (X-ray computed tomography (CT), projection X-ray, single-view X-ray sensor, multi-view X-ray sensor, smart X-ray sensors). Metals/composites may be used to manipulate electromagnetic fields, including tailored meta-materials (e.g., isolation and control for microwave, mmwave, THz sensors).

Various types of materials and structures which may be used for the entrance and exit doors have been described. However, it is to be understood that these components do not require any specific material or structure, and that any of a variety of different materials and door configurations which provide a desired isolation (electromagnetic, radiation, atmospheric, and so on) may be implemented.

Inspection system 10 provides the necessary isolation using entrance and exit doors 45 and 55, and does not therefore require open tunnel structures (although such tunnels may be configured with entrance and exits doors if so desired). Since tunnels are not required, the overall size of the inspection system may be reduced, which is desirable in size-limited applications such as airport and seaport baggage handling locations. In addition, multiple inspection systems, each having the same or different sensor system, may be placed in relatively close proximity. Such arrangements are possible without sacrificing performance since each inspection system is effectively isolated.

As a matter of convenience, embodiments will be described in the context of a baggage inspection system utilizing a sensor system having a NQR sensor. Particular reference will be made to "baggage" which is inspected for explosives, contraband, threat objects, and other items of interest using the NQR sensor. However, it is to be understood that embodiments of the invention are not so limited and that the teachings herein apply equally to other sensor systems and to the inspection of other types of specimens. The terms "baggage" and "specimen" are used herein to generally define items that may be inspected by an inspection system. In some instances, these items may contain, or be constructed of, various types of explosive materials. Possible types of baggage and specimens include, for example, passenger baggage, checked baggage, parcels, mail, packages, containers, cargo, vehicles, people, laptop or portable computers, and the like. In non-destructive testing applications, specimens may include materials, products, system components, and organic materials, among others.

Referring back to FIG. 4, conveyor 50 is shown advancing baggage 30a toward entrance aperture 35. Entrance door 45 and exit door 55 are in the open position, exposing entrance aperture 35 and exit aperture 60. In FIG. 5, conveyor 40 positions baggage 30a within inspection zone 20, and the entrance and exit doors are moved vertically upward into the closed position. Since the entrance and exit doors are closed, the baggage and sensor system are effectively isolated within the inspection system. Note that conveyor 50 has queued baggage 30b. At this point, sensor system 25 inspects baggage 30a according to the particular technology utilized by the sensor system (for example, NQR, CT, NMR, and the like).

In accordance with one embodiment, sensor system 25 is implemented using a conventional QR sheet coil or tube array coil system configured to detect the presence of explosives in baggage using nuclear quadrupole resonance (NQR). An appropriately configured QR sensor system can detect a wide range of explosives and illegal drugs.

NQR is a branch of radio frequency spectroscopy that has been used for the detection of explosives and drugs. NQR exploits the inherent electrical properties of atomic nuclei. Nuclei with non-spherical electric charge distributions possess electric quadrupole moments. In solid materials, electrons and atomic nuclei produce electric field gradients. These electric field gradients interact with the nuclear quadrupole moments of quadrupolar nuclei, producing energy levels for the quadrupolar nuclei, and hence their characteristic transition frequencies. Measurements of these frequencies, or relaxation time constants, or both, can indicate not only which nuclei are present but also their chemical environment.

In the inspection process, using carefully tuned pulses of low intensity electromagnetic (RF) waves, a quadrupole resonance device probes the molecular structure of targeted items such as explosives and narcotics. The effects of quadruple resonance momentarily disturb the alignment of target nuclei within the item scanned. As the nuclei realign themselves after the RF energy is turned off, they emit a characteristic signal of their own, which is picked up by a receiver and sent to a computer for rapid analysis. The signal emitted by each type of explosive or illegal drug is unique.

Specialized RF pulse sequences have been developed for optimal detection of particular explosives and illegal drugs such as cocaine and heroin. RF signal production and the detection of NQR return signals may be accomplished using, for example, the techniques disclosed in U.S. Pat. No. 5,592,083, or U.S. application Ser. No. 10/651,657, entitled "TUBE ARRAY COIL FOR QUADRUPOLE RESONANCE (QR) SCANNING, filed on Aug. 29, 2003, both of which are assigned to Quantum Magnetics, Inc., of San Diego, Calif.

In general, a suitable QR sensor includes a RF subsystem in communication with a QR sheet coil or a QR tube array coil. Using well-known techniques, the RF subsystem may utilize a variable frequency RF source to provide RF excitation signals at a frequency generally corresponding to a predetermined, characteristic NQR frequency of a specimen. During the inspection process, the RF excitation signals generated by the RF source may be introduced into the specimen. In some embodiments, the QR sheet coil or QR tube array coil may serve as a pickup coil for NQR signals generated by the specimen, thus providing an NQR output signal which may be sampled to determine the presence of target substance, such as an explosive.

As shown in FIG. 6, after the just-described inspection process has been completed, entrance and exit doors 45 and 55 may each be moved vertically downward to expose entrance and exit apertures 35 and 60, respectively. Conveyor 40 then advances baggage 30a through inspection zone 20 where it is received by exit conveyor 65. At about the same time, or substantially the same time, entrance conveyor 50 advances baggage 30b toward the inspection system where it is received and positioned by conveyor 40. In FIG. 7, conveyor 65 carries baggage 30a away from the inspection system. In addition, conveyor 40 has positioned baggage 30b within the inspection zone, and conveyor 50 has queued baggage 30c. Baggage 30b may then be inspected by sensor system 25, and the just-described process may be repeated continuously for different baggage items.

Specific reference is made to the use of conveyors to carry baggage to and from the inspection system, as well as for positioning the baggage within the inspection zone. However, embodiments of the invention are not so limited and almost any type of positioning or transport device or system, which can support the baggage transportation requirements of the inspection system, may alternatively be used.

Synchronizing the various components of the inspection system (for example, conveyors 40, 50, and 65, and entrance and exit doors 45 and 55) may reduce the amount of time required to position, scan, and remove the baggage from the inspection zone. Time savings may be on the order of a few seconds per baggage item, which would amount to a significant reduction in overall inspection time in environments, such as airports, which experience workloads of several hundred bags-per-hour.

Entrance and exit doors 45 and 55 may be controlled using any number of positioning mechanisms which are capable of providing relative motion between the doors and their associated apertures. For instance, the doors may be slideably coupled to linear rails positioned near the entrance and exit apertures. The doors may then be driven using a suitable drive mechanism such as a pneumatic drive, a hydraulic drive, a magnetic drive, a rail gun, belts, chains, ropes, or any other device which provides the necessary positioning of the doors. Specific examples of various types of door positioning mechanisms will be described in more detail in conjunction with later figures.

A number of different embodiments have been described in which two separate doors, move vertically relative to the travel path of inspected baggage. However, many alternative embodiments are possible. For instance, the inspection system may be implemented with only a single door. Referring to FIG. 4 as an example, such an embodiment would have entrance door 45, but exit door 55 and exit aperture 60 would be omitted. Inspection of baggage would proceed in a manner similar to that previously described, with the primary distinction being that the baggage enters and exits the inspection system through the same aperture (for example, entrance aperture 35).

Another alternative is to arrange the entrance and exit doors so that they close downward in a vertical path relative to the travel path of inspected baggage. This may be accomplished by locating entrance and exit doors 45 and 55 above, not below, entrance and exit apertures 35 and 60. Similarly, the entrance and exit doors may also be arranged so that they each open and close in a horizontal path relative to the travel path of inspected baggage. This may be accomplished by locating entrance and exit doors 45 and 55 on either side of the entrance and exit apertures. Other possibilities include implementing one or more doors that rotate relative to an associated entrance or exit aperture, or the use of hinged doors. It should be understood that the entrance door may operate in one manner or direction, which differs from the manner or direction of the exit door.

Figure 8:
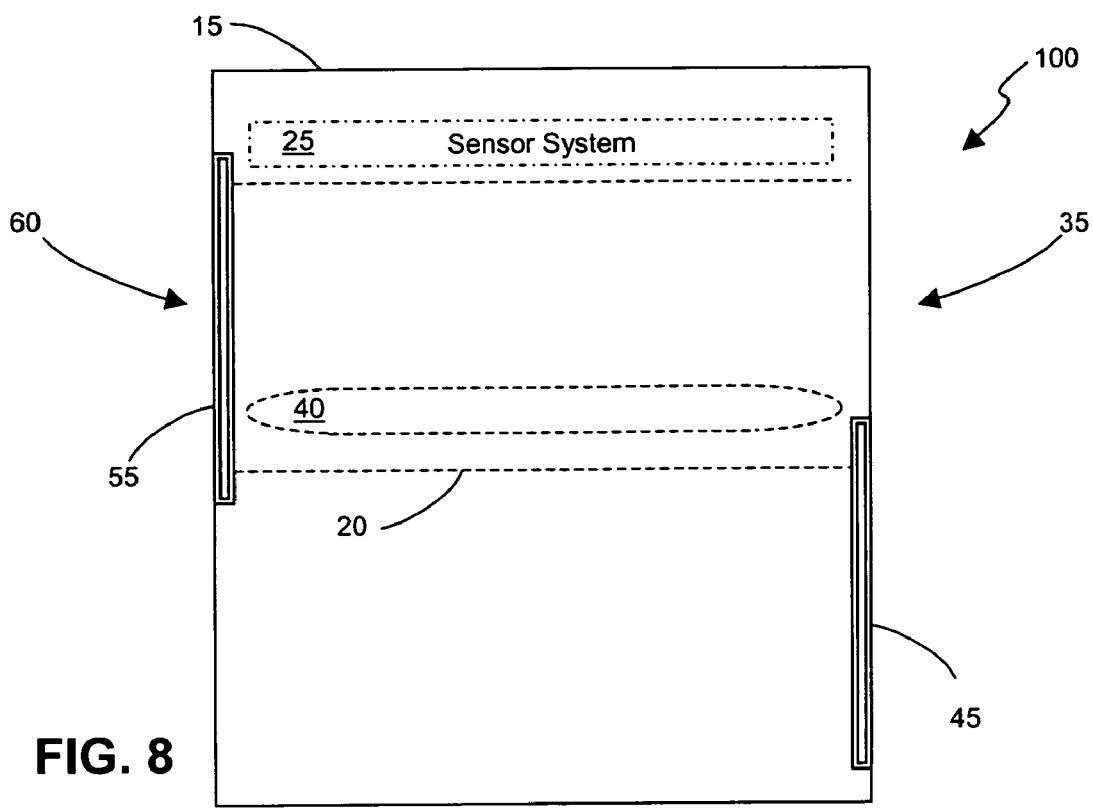
FIG. 8 is a side view of an inspection system having doors positioned on the inside of the housing.
Figure 9:
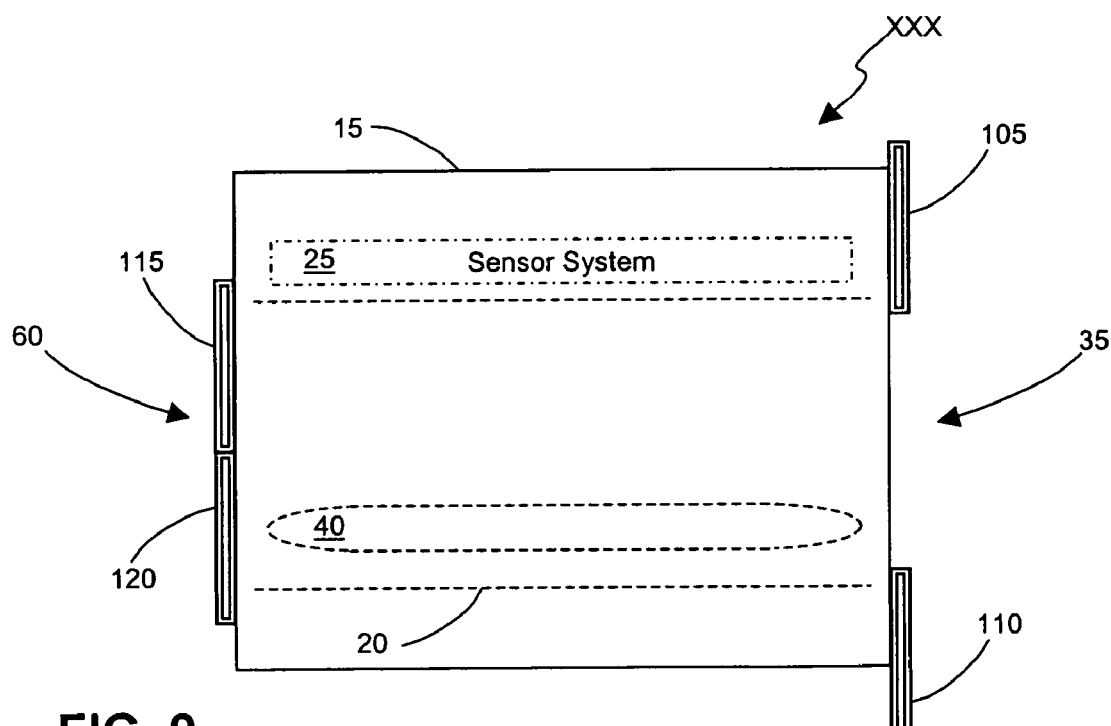
FIG. 9 is a side view of an inspection system having doors composed of two door panels.

Still further embodiments are shown in FIGS. 8 and 9. In FIG. 8, entrance and exit doors 45 and 55 are shown operating internally within housing 15. In this figure, the entrance door is in the open position, and the exit door is in the closed position. The housing has been extended beneath conveyor 40 to accommodate the additional area needed for the opening of the entrance and exit doors.

FIG. 9 illustrates an embodiment in which each of the entrance and exit doors are implemented as two separate door panels. The entrance door includes top panel 105 and bottom panel 110. The exit door similarly includes top panel 115 and bottom panel 120. The top and bottom panel of each door may be slideably moved in opposing directions, vertically in the example of FIG. 9, to provide or inhibit access to their respective apertures.

For instance, the exit door and included panels 115 and 120 are in the closed position. To open the exit door, panel 115 is moved vertically upward while panel 120 is moved vertically downward. Panels 105 and 110 of the entrance door have been moved in such a manner, exposing entrance aperture 35. To close the entrance door, for example, panel 105 is moved downward and panel 110 is moved upward until these two structures make contact. If described, the entrance and exit doors may be alternatively structured so that their respective panels open and close horizontally, or at any other angle, relative to the baggage travel path. Alternatively, one of the apertures may be opened and closed by a one-element door, and the other by a two-element door.

Figure 10:
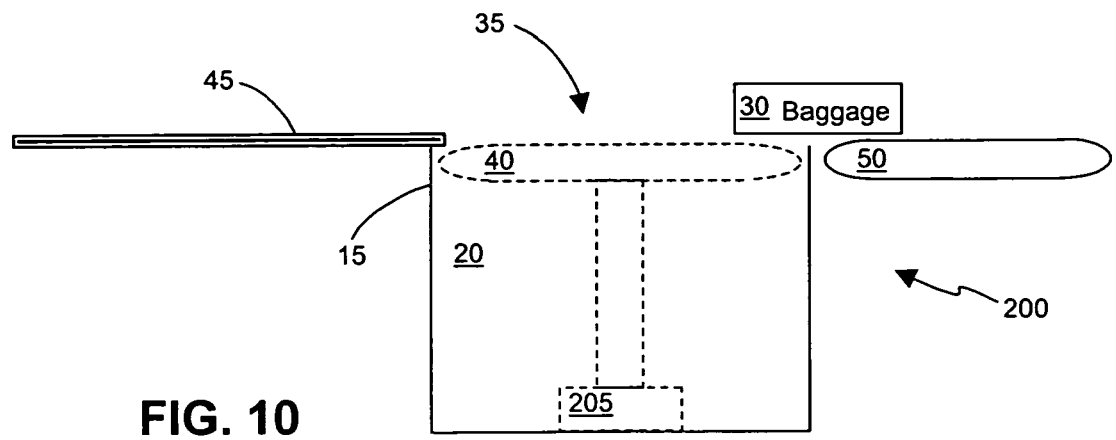
FIGS. 10 through 12 collectively show a generalized example of a baggage inspection process using a single door inspection system.

Inspection systems which utilize a single door for isolation are also possible. For example, in FIG. 10, conveyor 50 is shown advancing baggage 30 toward entrance aperture 35, which is located on the top side of inspection system 200. Entrance door 45 is in the open position, exposing entrance aperture 35. Lift 205 positions conveyor 40 near the top of the interior cavity of housing 15. Conveyor 40 receives the baggage from conveyor 50. For clarity, sensor system 25 has been omitted from FIG. 10.

Figure 11:
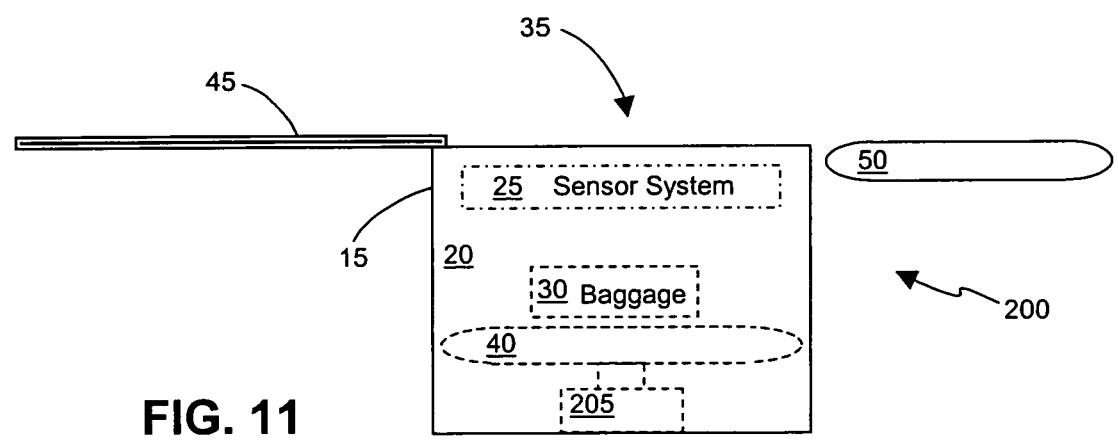
Figure 12:
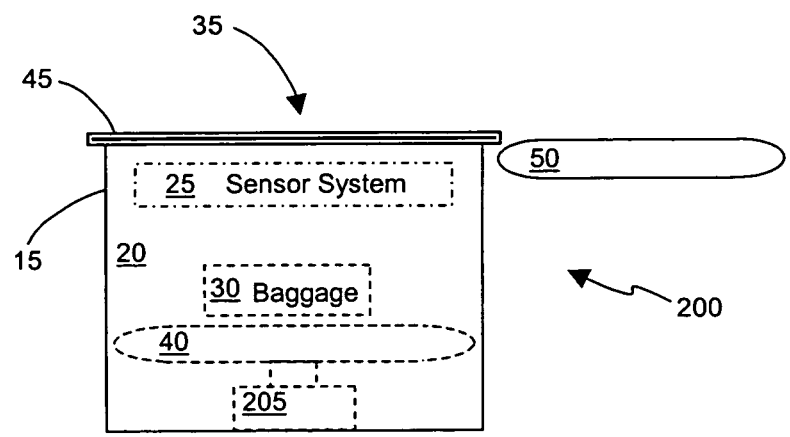

In FIG. 11, the lift lowers conveyor 40 along with the baggage. Once the baggage has been lowered into inspection zone 20 of the housing, entrance door 45 is advanced horizontally to seal the isolation system, as shown in FIG. 12. Once sealed, the inspection system may inspect the baggage in a manner similar to that described in conjunction with other embodiments. Upon completion of the inspection process, the process shown in FIGS. 11 and 12 may be reversed and the baggage expelled from the inspection system. The inspection system may then be readied to receive the next item of baggage, and the inspection process is repeated.

Figure 13:
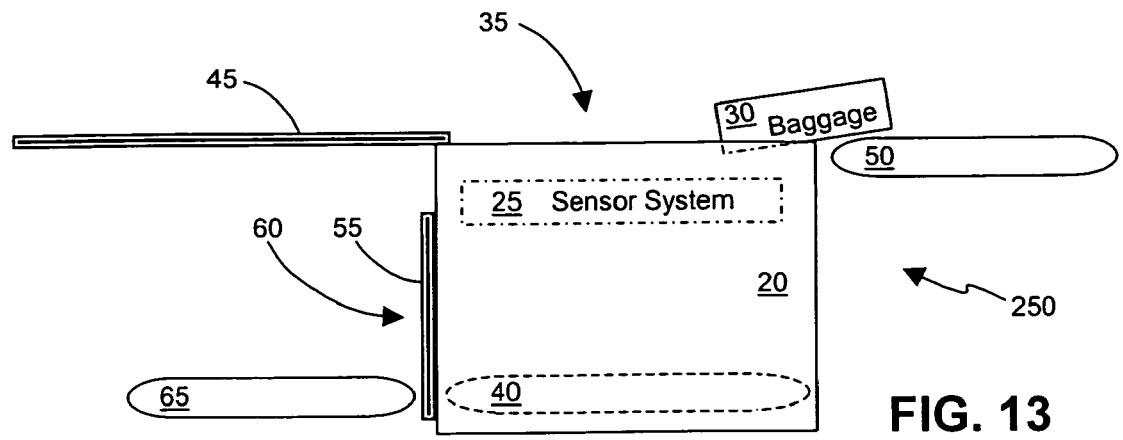
FIGS. 13 through 16 collectively show a generalized example of a baggage inspection process using a two door inspection system.
Figure 14:
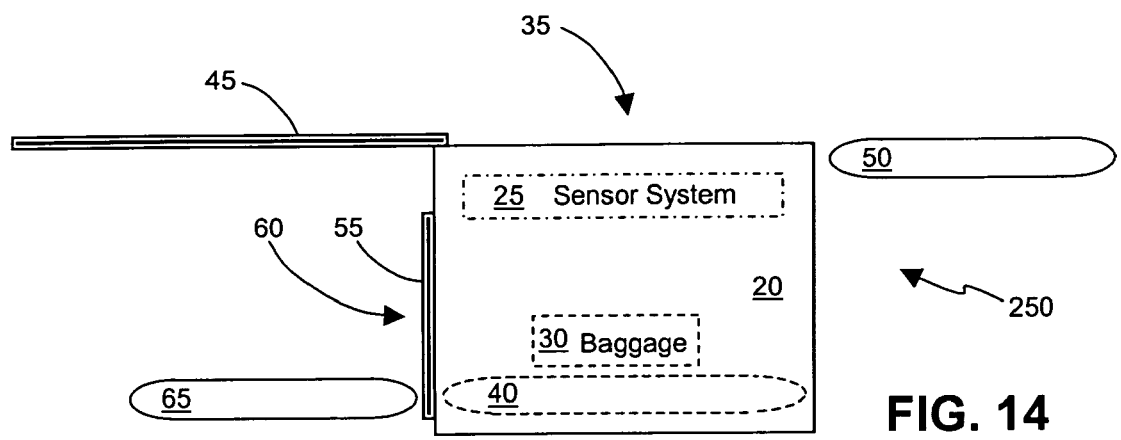
Figure 15:
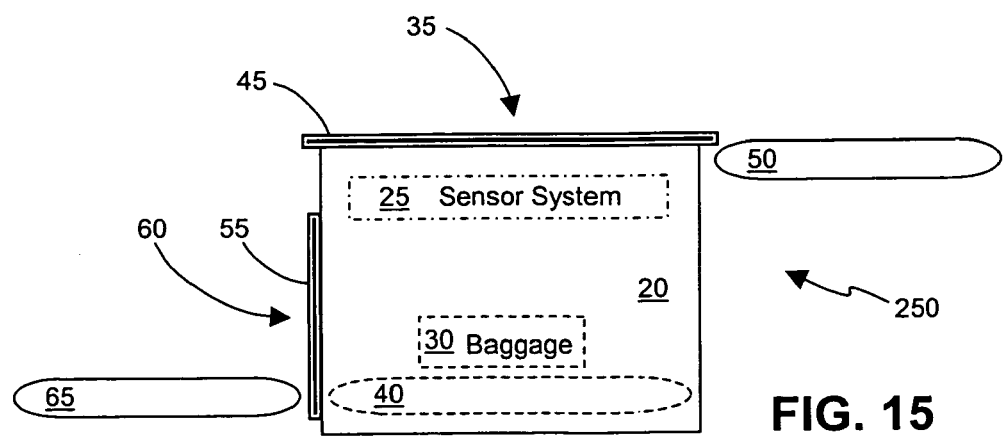

FIGS. 13 through 15 are side views of inspection system 250, and collectively show a generalized example of a baggage inspection process utilizing a top-loading inspection system. In FIG. 13, conveyor 50 advances baggage 30 toward entrance aperture 35. Similar to the inspection system of FIGS. 10 through 12, the entrance aperture of inspection system 250 is also on the top side of the system. Entrance door 45 is in the open position, exposing entrance aperture 35. In FIG. 14, conveyor 40 receives the falling baggage from conveyor 50. In this embodiment, no lift is necessary, but is possible should it be desired.

Figure 16:
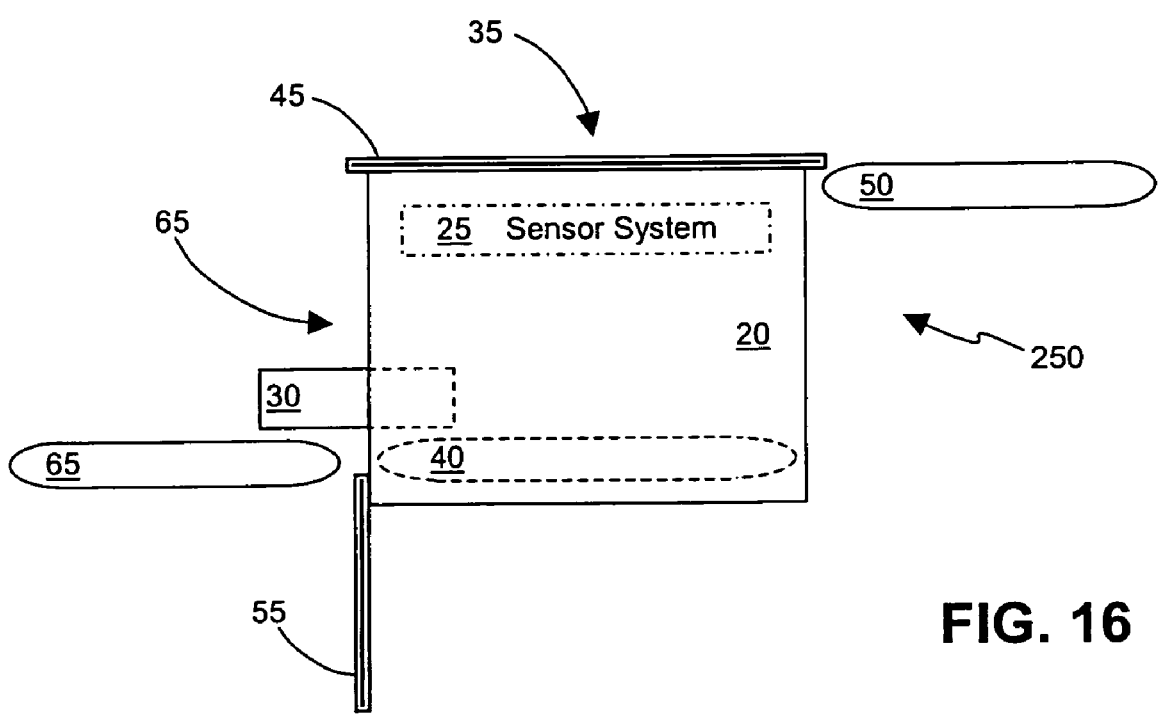

Once the baggage has been received into inspection zone 20, entrance door 45 may be advanced horizontally to seal the inspection system, as shown in FIG. 15. If necessary, conveyor 40 may adjust the position of the baggage within the inspection zone. Once sealed, the inspection system may inspect the baggage in a manner similar to that described in conjunction with other embodiments. As shown in FIG. 16, after the inspection process has been completed, and exit door 55 is moved vertically downward to expose exit aperture 60. The inspection system may then be readied to receive the next item of baggage for inspection. Various embodiment have been described, some having a single door and aperture, others utilizing two doors and an associated two apertures. It is to be understood that the entrance door and aperture may be located at any just about any location on the housing (for example, top, bottom, left side, right side, front side, rear side). In embodiments that utilize separate exit doors, the exit door and aperture may also be located at just about any location on the housing, as long as such location cooperates with the location of the entrance door and aperture. Most practical applications utilize entrance and exit doors which open and close either horizontally or vertically relative to the travel path of the baggage, but these doors may alternatively be moved in almost any orientation relative to the baggage travel path. In addition, multiple entrance doors and apertures, multiple exit doors and apertures, or both, are also possible and envisioned by the present disclosure.

FIG. 17 is a flowchart showing exemplary operations for inspecting a specimen for an item of interest. Block 140 recites selectively operating a positioning device located within a housing having a cavity that defines an inspection zone. Block 142 recites selectively operating a first sealing mechanism operatively coupled to the housing. The first sealing mechanism is selectively positionable between open and closed positions. The open position permits a specimen to pass through an entrance aperture and to come into contact with the positioning device, and the closed position seals the entrance aperture to effectively isolate the inspection system. Block 144 recites inspecting the specimen for an item of interest after the first sealing mechanism is positioned in the closed position.

Figure 18:
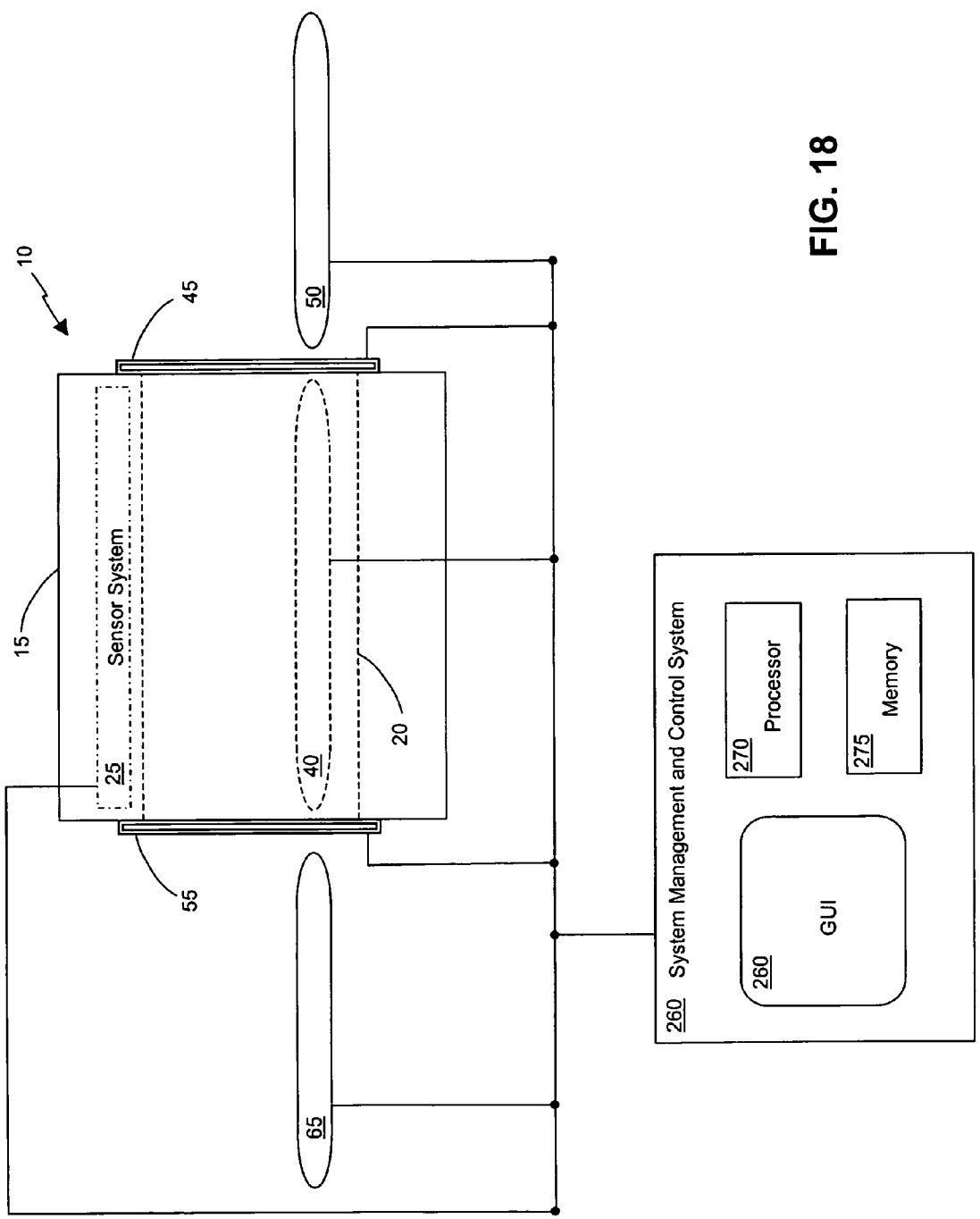
FIG. 18 is block diagram of a system, in accordance with an embodiment of the invention, which may be implemented to control, manage, operate, and monitor, the inspection system of FIGS. 1-3.

FIG. 18 is block diagram of system 260, which may be implemented to control, manage, operate, and monitor, the various components associated with inspection system 10. System 260 is shown having a graphical user interface 265, processor 270, and memory 275. The processor may be implemented using any suitable computational device that provides the necessary control, synchronization, monitoring, and data analysis of the various systems and components associated with the inspection system. System 260 is shown in communication with a single inspection system, but embodiments in which system 260 is used to control multiple inspection systems are also possible.

In general, processor 270 may be a specific or general purpose computer such as a personal computer having an operating system such as DOS, Windows, OS/2 or Linux; Macintosh computers; computers having JAVA OS as the operating system; graphical workstations such as the computers of Sun Microsystems and Silicon Graphics, and other computers having some version of the UNIX operating system such as AIX or SOLARIS of Sun Microsystems; or any other known and available operating system, or any device including, but not limited to, laptops and hand-held computers. Graphical user interface 265 may be any suitable display device operable with any of the computing devices described herein and may comprise a display such as an LCD, LED, CRT, plasma monitor, and the like.

The communication link between system 260 and the various components of the inspection system may be implemented using any suitable technique that supports the transfer of data and necessary signaling for operational control of the various components (for example, conveyors 40, 50, and 65, sensor system 25, doors 45 and 55) of the inspection system. The communication link may be implemented using conventional communication technologies such as UTP, Ethernet, coaxial cables, serial or parallel cables, and optical fibers, among others. Although the use of wireless communication technologies is possible, they are typically not utilized since they may not provide the necessary level of security required by many applications such as airport baggage screening systems.

In some implementations, system 260 is physically configured in close physical proximity to the inspection system, but system 260 may be remotely implemented if so desired. Remote implementations may be accomplished by configuring system 260 and the inspection system with a suitably secure network link that comprises anything from a dedicated connection, to a local area network (LAN), to a wide area network (WAN), to a metropolitan area network (MAN), or even to the Internet.

The various methods and processes described herein may be implemented in a computer-readable medium using, for example, computer software, hardware, or some combination thereof. For a hardware implementation, the embodiments described herein may performed by processor 270, which may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein maybe implemented with separate software modules, such as procedures, functions, and the like, each of which perform one or more of the functions and operations described herein. The software code can be implemented with a software application written in any suitable programming language and may be stored in a memory unit (for example, memory 275), and executed by a processor (for example, processor 270). The memory unit may be implemented within the processor or external to the processor, in which case it can be communicatively coupled to the processor using known communication techniques. The memory unit shown in FIG. 18 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, or other similar or effective memory or data storage device.

As previously noted, a number of different door configurations, materials, and drive mechanisms may be used in implementing entrance doors 45 and 60. In accordance with alternative embodiments, FIGS. 19 through 32 depict various components of a sealing mechanism which may be utilized by any of the inspection systems discussed herein.

Figure 19:
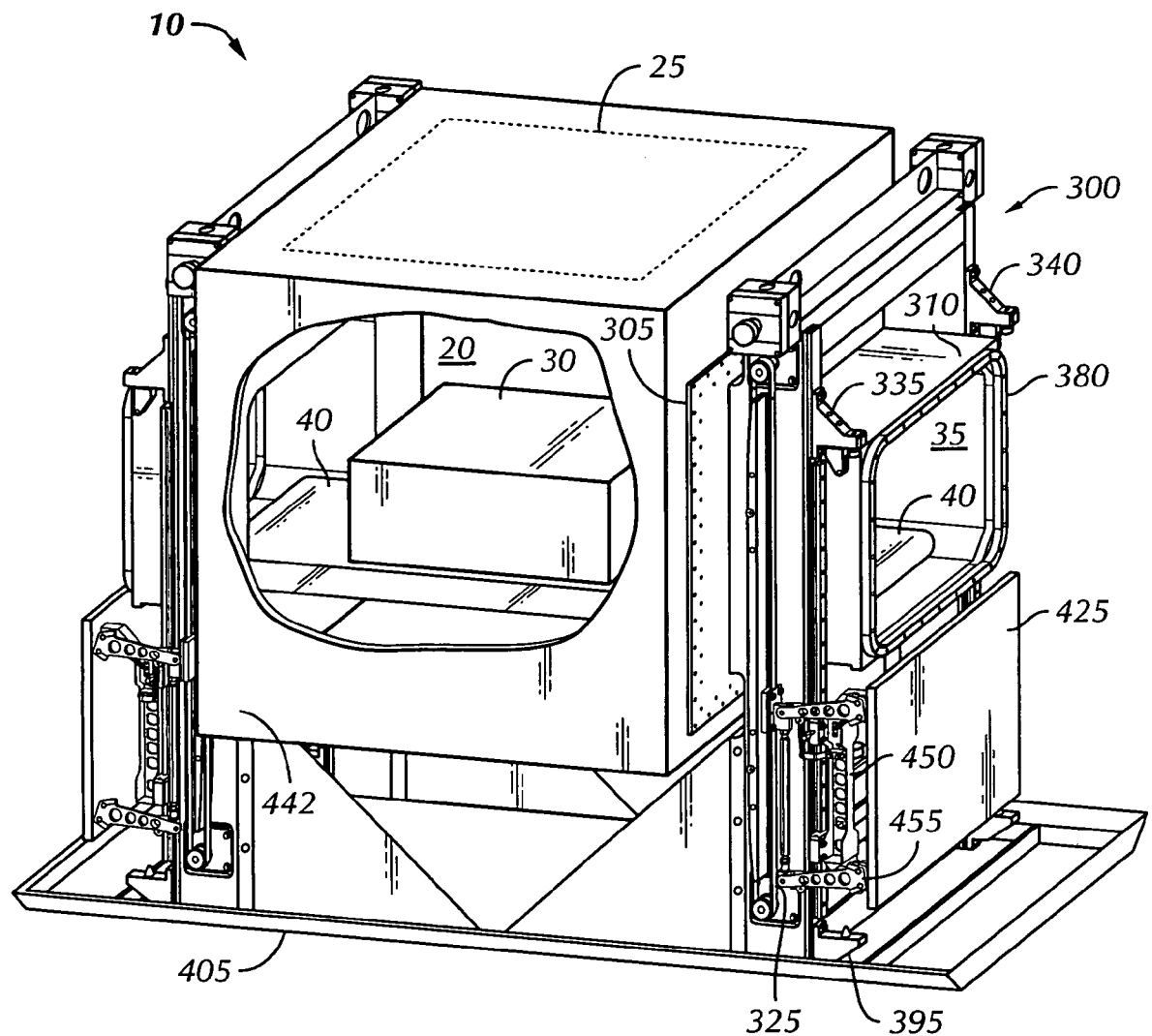
FIGS. 19 through 21 are perspective views of an alternative sealing mechanism attached to an inspection system.
Figure 20:
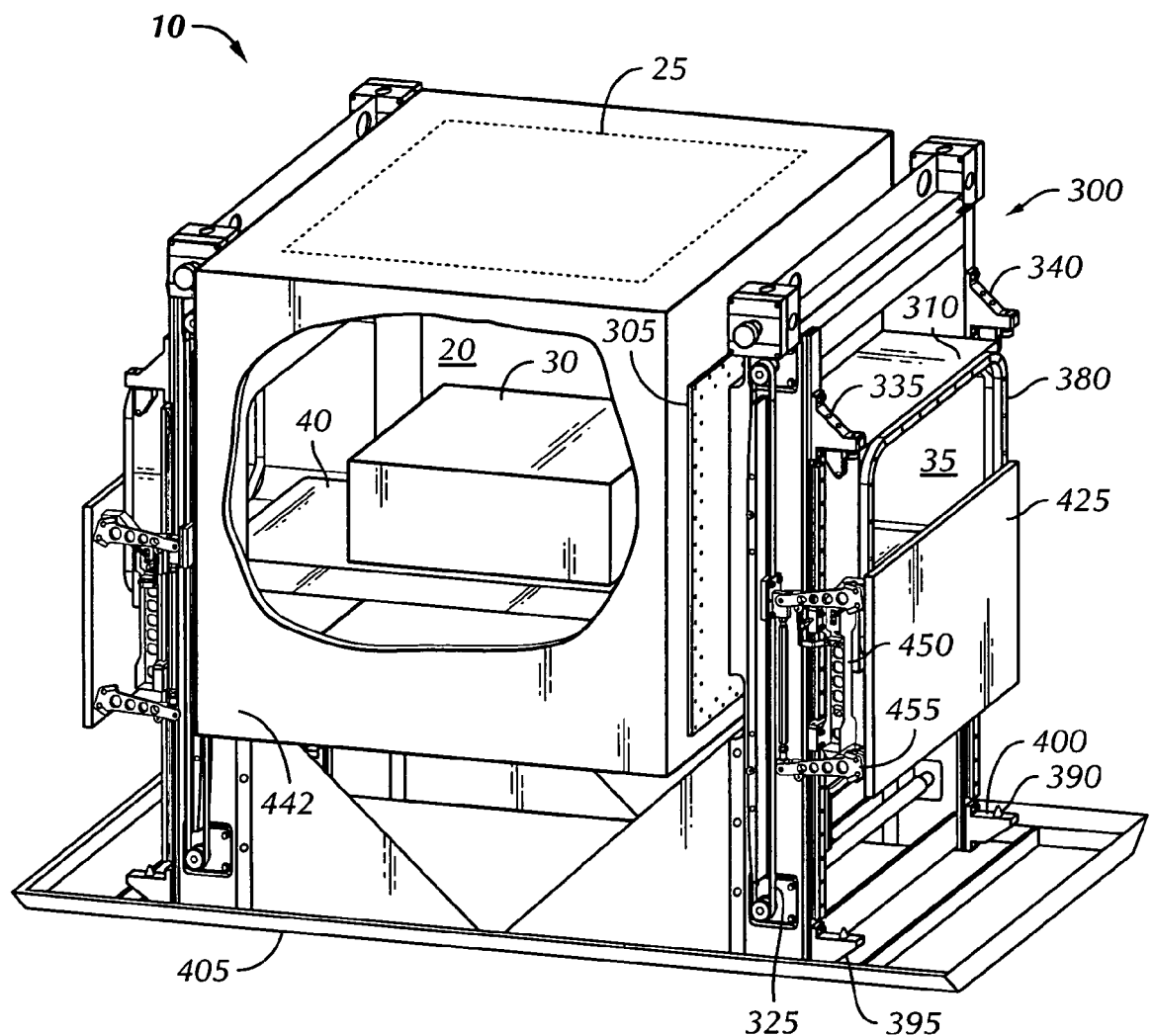
Figure 21:
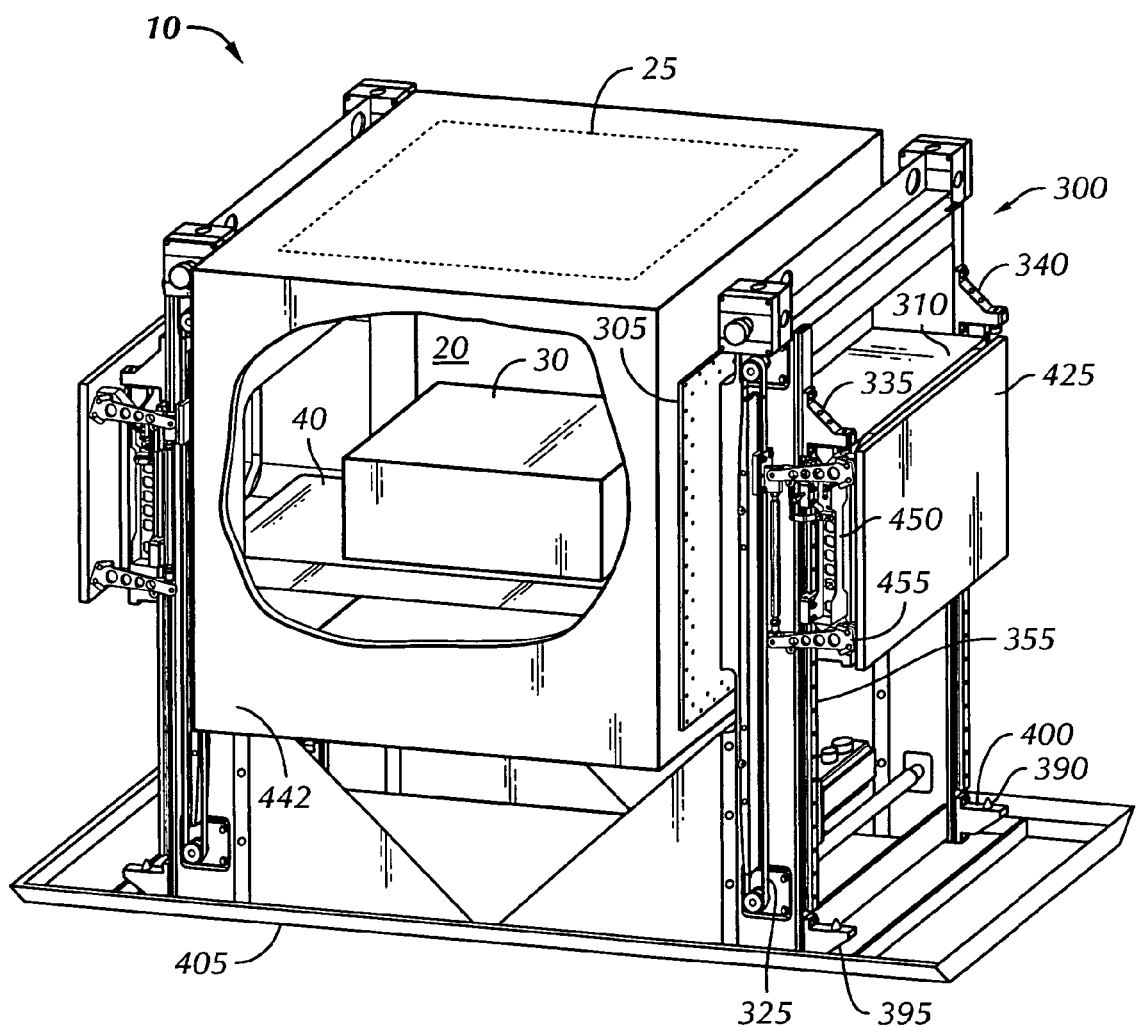
Figure 22:
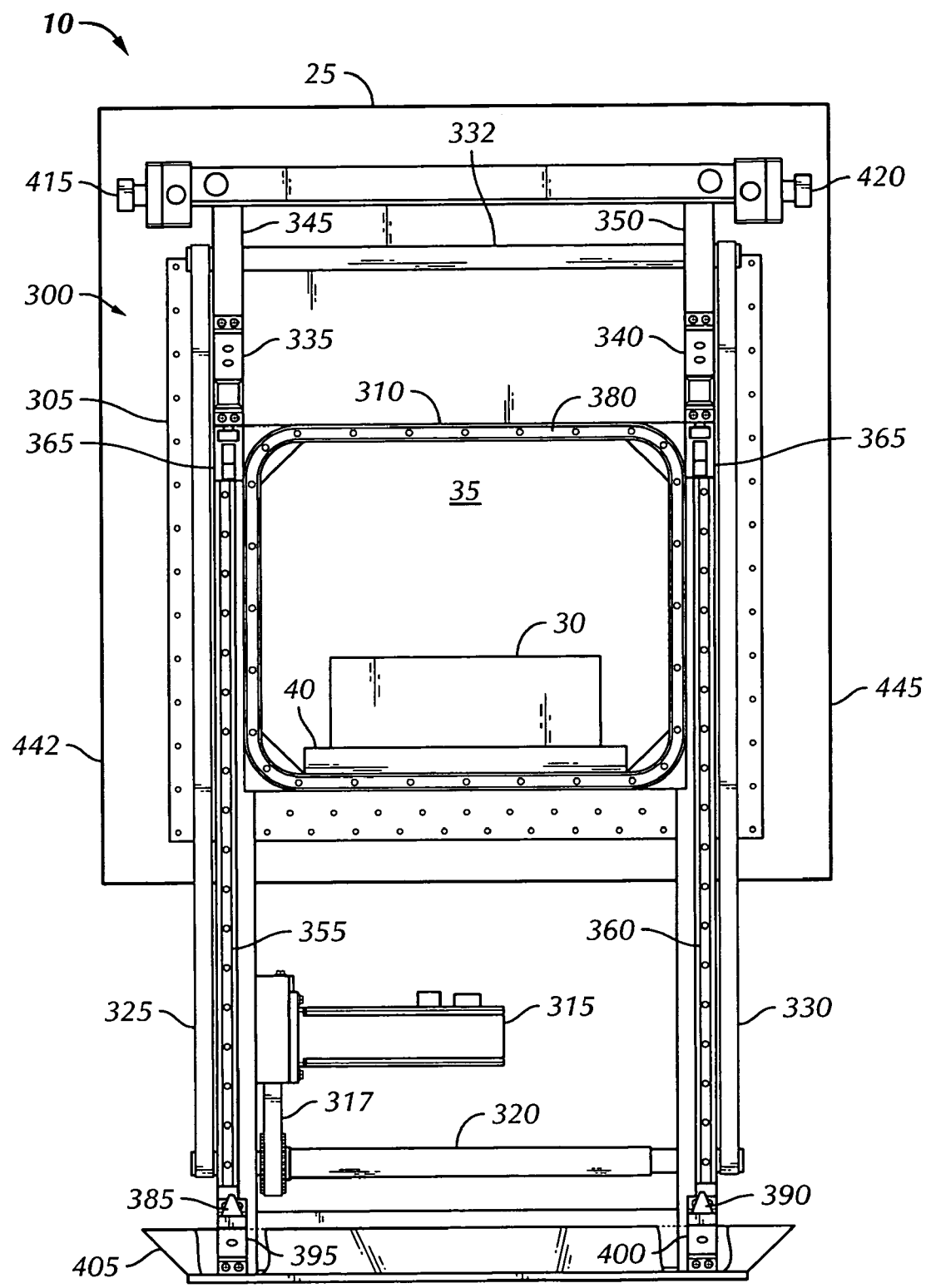
FIG. 22 is a front view of the inspection system shown in FIGS. 19 through 21, but the sliding door and associated linkage have been omitted to reveal the underlying structures.

FIGS. 19 through 21 are perspective views of sealing mechanism 300 attached to inspection system 10. FIG. 22 is a front view of the inspection system shown in FIGS. 19 through 21, but the sliding door and associated linkage has been omitted to reveal the underlying structures.

As shown in these figures, sealing mechanism 300 includes flange 305 and interface 310. The interface defines entrance aperture 35, which provides access to inspection zone 20. Motor 315 (FIG. 22) utilizes belt 317 for driving lower drive shaft 320. Belts 325 and 330 connect the lower drive shaft to upper drive shaft 332, which is located above the entrance aperture. Upper brackets 335 and 340 are attached to left and right frames 345 and 350, respectively. Left linear rail 355 is shown attached to the left frame while right linear rail 360 is shown attached to the right frame. The length of these rails is typically twice the height of the aperture defined by interface 310. This permits sliding door 425 to completely seal entrance aperture 35 when closed, and to fully retract when open.

Interface 310 is shown protruding from flange 305. It is to be understood that the length of the protrusion of flange 305 is not to be confused with, for example, the considerably longer wave-guide tunnel extensions which are commonly used in various types of explosive detection systems. In an embodiment, the interface need only protrude from flange 305 to the extent necessary to accommodate the various door linkage and drive components. Using a conventional passenger baggage inspection system as an example, the interface protrudes from the flange a distance of only a few inches (4-9 inches being typical). This protrusion is considerably shorter than a typical wave-guide tunnel, which can have a length of 24-48 inches, or more, that is required by such passenger baggage inspection systems. If desired, the protrusion of interface 310 may be further minimized by alternatively locating the door linkage and drive components on front and rear sides 442 and 445 of the inspection system.

Upper brackets 335 and 340 may each have an attached cam latch 365. The cam latches facilitate closure of the sliding door, as will be described in more detail herein. An exposed edge of interface 310 is shown having seal 380. The seal is typically used to facilitate contact with sliding door 425, and may be formed from any suitable material which cooperates with the door to provide the necessary isolation of the inspection system. Door stops 385 and 390 are shown attached to lower brackets 395 and 400.

The type of materials depends on the type of sensor system utilized, and the type and amount of isolation desired. For example, crushable conductive material, such as copper or aluminum, may be used as the seal in an inspection system which contains a QR sensor. Alternatively, the seal may be constructed of foam or rubber whenever X-ray based sensor systems are utilized in the inspection system. Materials for the seal may include high conductivity metals (electromagnetic shielding), high-z materials for radiological shielding, and metal/composite meta-materials to minimize reflection at high frequency (microwave, mmwave). Exemplary metals include, but are not limited to, copper, gold, silver, nickel, etc. Physical structures include various embodiments of a highly conductive and mechanically sound environmental sealing surface. The seal materials should be engineered to maintain tolerance under repeated cycling.

If desired, the left and right frames and included components may be secured to base 405. Optional stop buttons 415 and 420 are shown on the upper portion of frame 345. These stop buttons are conveniently located near the entrance aperture and may be used to manually halt operation of the sealing mechanism in, for example, emergency situations. Although inspection system 10 is shown with two sealing mechanisms 300, only one is required. One sealing mechanism is shown positioned at the front side of the system, and the other is positioned at the rear side and is partially hidden. Operation of sealing mechanism 300 will be described after various components of the mechanism, which are depicted in FIGS. 23-32, have been discussed.

Figure 23:
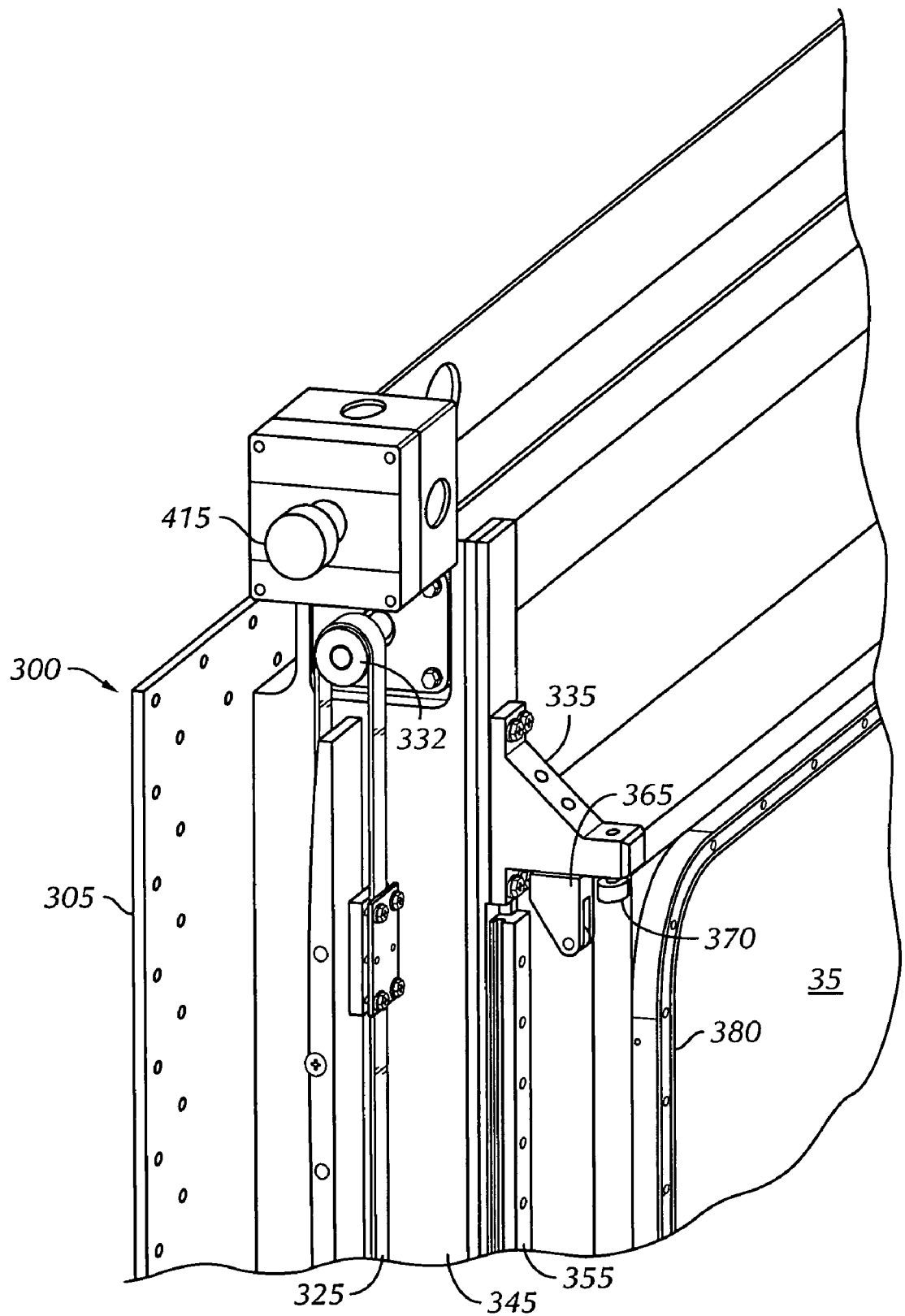
FIG. 23 is a close-up partial view of the upper left side of the sealing mechanism of FIGS. 19 through 21, portions of the door linkage having been omitted for clarity.

Referring now to FIG. 23, a close-up view of the upper left side of sealing mechanism 300 is shown. The door and associated linkage have been omitted from this figure to reveal the underlying components. In this figure, linear rail 355 is attached to left frame 345, and cam latch 365 is attached to the bottom side of bracket 335, adjacent to doorstop 370. The cam latch is sized to receive a cam that is in communication with the sliding door. During operation, the cam engages the cam latch, causing the door to move inwardly as it nears the end of its travel path. This causes an interior portion of the door to contact seal 380, effectively isolating inspection system 10. This aspect will be described in more detail in conjunction with FIGS. 26 through 29.

Figure 24:
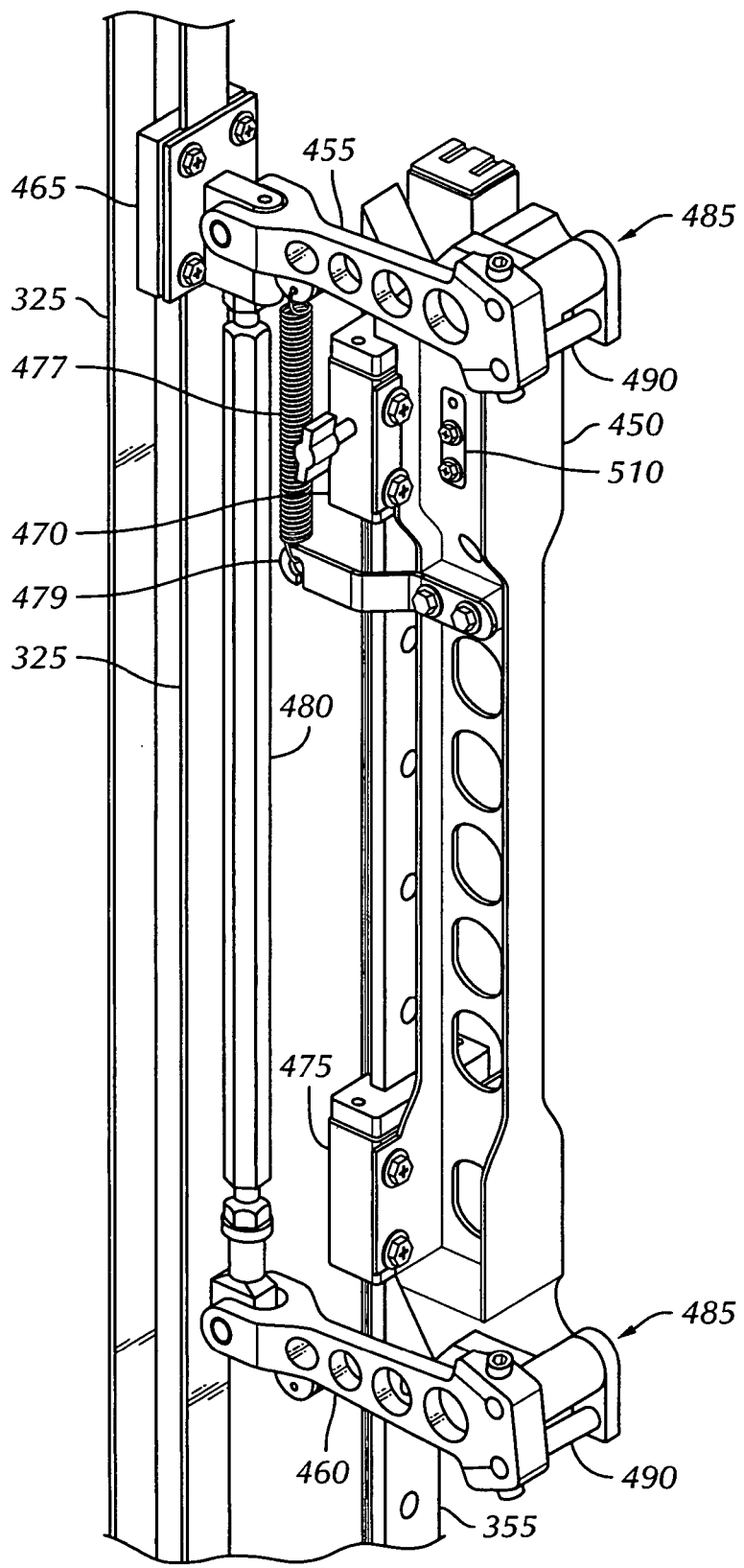
FIG. 24 is a perspective view of door linkage components that may be implemented in the sealing mechanism of FIGS. 19 through 21.

FIG. 24 is a perspective view of door linkage components that may be implemented in sealing mechanism 300. The linkage shown is for the left side of entrance aperture 35, but the right side linkage essentially mirrors the left side linkage. Carriage link 450 is attached to upper control arm 455 and lower control arm 460. The upper control arm is shown in more detail in FIG. 31. Referring still to FIG. 24, the upper control arm is pivotally attached to clamp 465, which is secured to belt 325. Belt 325 is a transport device that may be used to open and close door 425. During operation, the door may be closed by moving belt 325 upward. Conversely, the door may be opened by moving belt 325 downward.

Carriage link 450 is also attached to upper carriage 470, which sideably engages linear rail 355. The carriage link is similarly attached to lower carriage 475, which also sideably engages linear rail 355. Turnbuckle 480 is pivotally attached to lower control arm 460, and connects clamp 465 and attached upper control arm 455 with lower control arm 460. Carriage spring 477 is attached to bracket 479.

Figure 25:
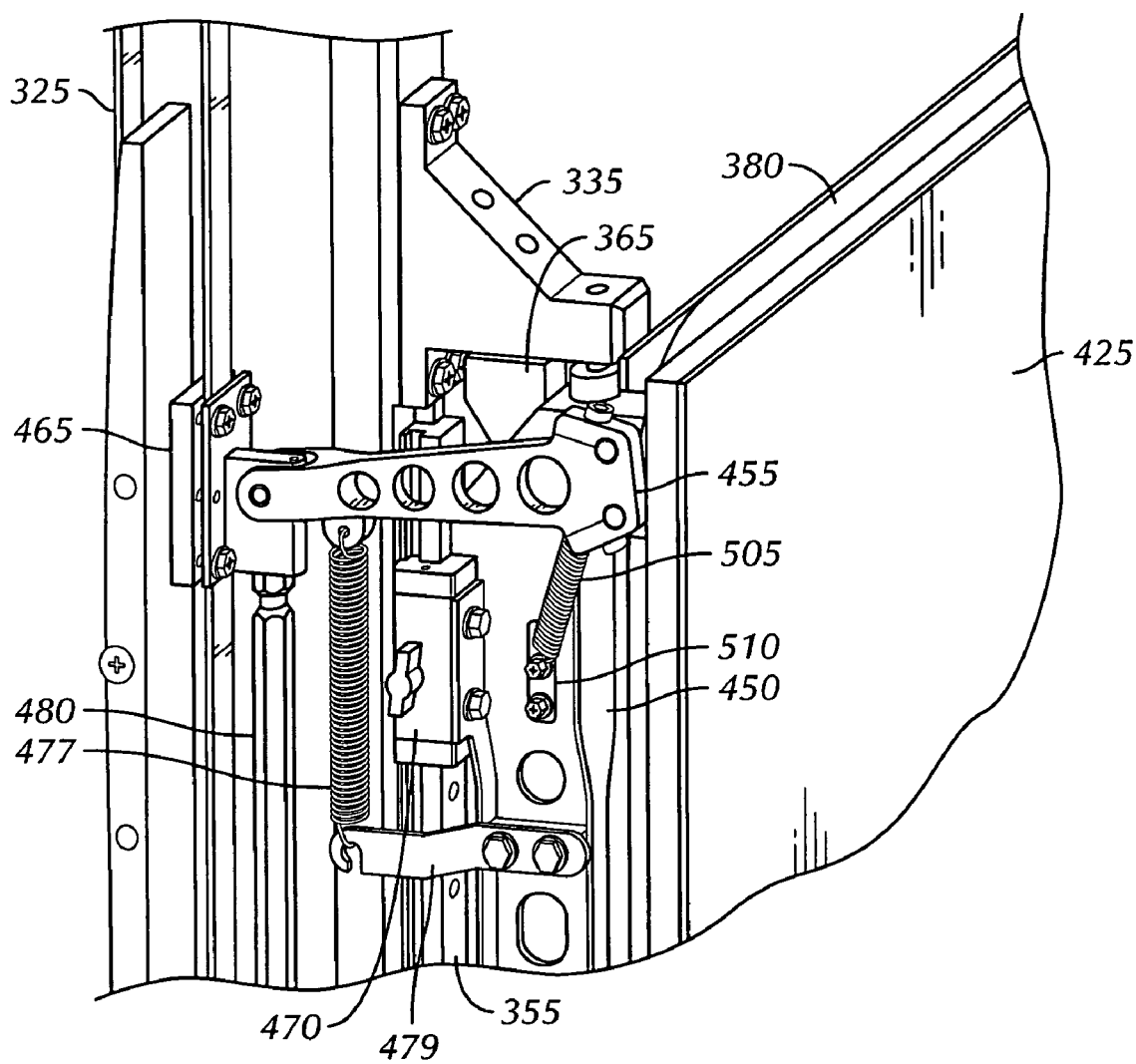
FIG. 25 is a close-up partial view of the upper left side of the sealing mechanism of FIGS. 19 through 21.

FIG. 25 is a close-up view of the upper left side of sealing mechanism 300. In this figure, door 425 is shown secured to upper control arm 455. The door is in the closed position, contacting seal 380. Cam spring 505 is attached to bracket 510.

Figure 26:
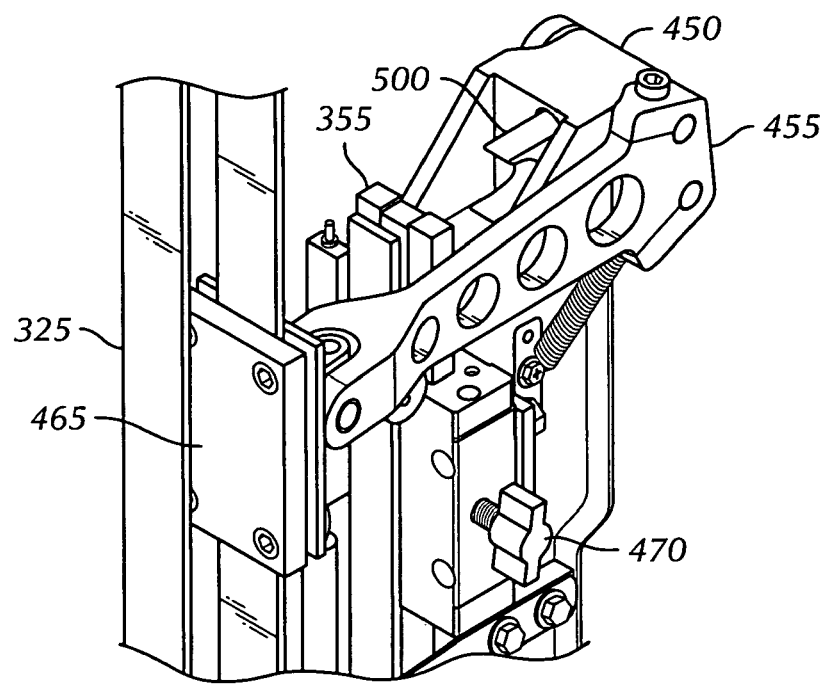
FIG. 26 is a close-up view of the top portion of the left-side door linkage, from the viewpoint of looking away from the housing of the inspection system.
Figure 27:
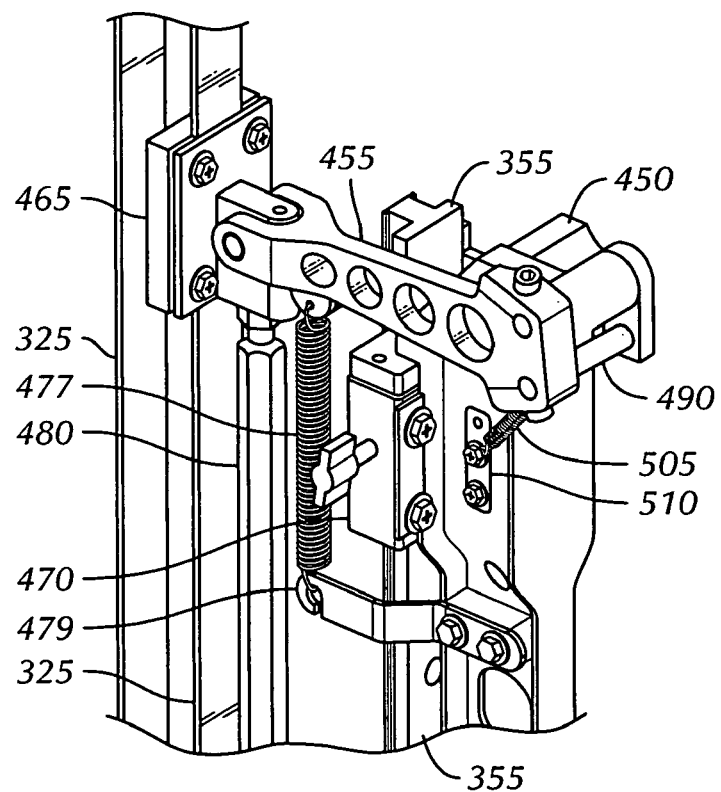
FIG. 27 is a close-up view of the same top portion of the door linkage which is shown in FIG. 26, but from the viewpoint of looking toward the housing of the inspection system.

FIG. 26 is a close-up isometric view of the top portion of the left-side door linkage, from the viewpoint of looking away from the housing of the inspection system. FIG. 27, on the other hand, is a close-up view of the same top portion of the door linkage, but from the viewpoint of looking toward the housing of the inspection system. To permit a clearer view of the door linkage, door 425 has been omitted from these figures. Cam 500 is shown positioned within a recess formed in an upper portion of carriage link 450. The cam pivots within the recess of the carriage link, and contains an open end which is sized and positioned to engage cam latch 365 (not shown in this figure). Referring ahead to FIG. 30, a more detailed view of cam 500 is shown. The cam is shown having bearing 515, which facilitates pivoting of this component within carriage link 450. The cam has cam spring 505 which, in FIG. 27, is shown attached to bracket 510.

Figure 28:
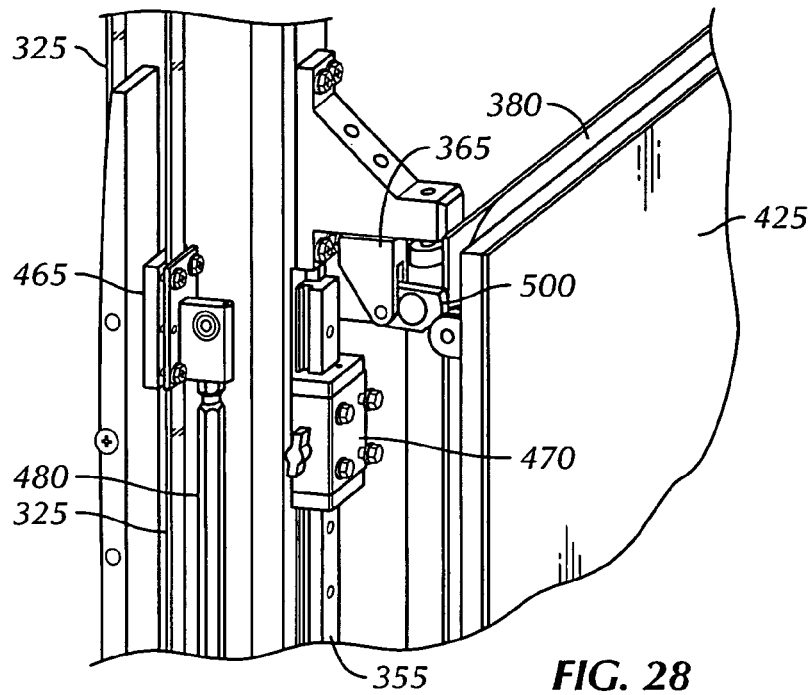
FIG. 28 is a close-up view of the upper left side of the sealing mechanism, portions of the door linkage having been omitted for clarity.

FIG. 28 is a close-up view of the upper left side of sealing mechanism 300. The upper control arm and carriage link have been omitted to show the relative positioning of cam 500 and cam latch 365 when door 425 is in the fully closed position. In this figure, the cam is fully engaged with the cam latch, causing an interior portion of door 425 to contact seal 380.

Figure 29:
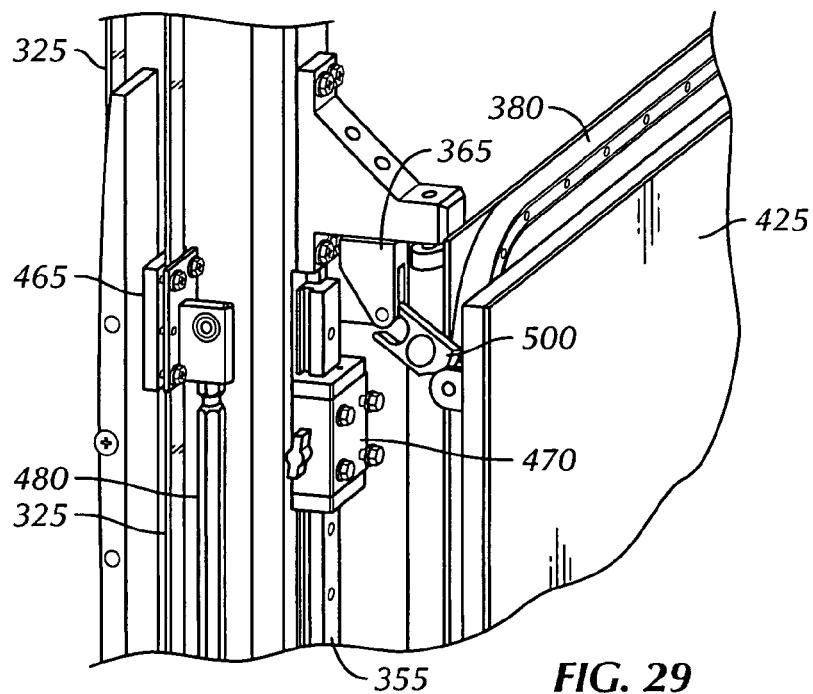
FIG. 29 is the same view of the sealing mechanism shown in FIG. 28, but the door has been moved downward partially exposing the entrance aperture.

FIG. 29 is essentially the same view as FIG. 28, but in FIG. 29 the door has been moved downward. Cam 500 no longer engages the cam latch, permitting the door to move outward and out of contact with seal 380. Since the door is no longer in contact with the seal, the door can freely continue its downward motion, providing access to entrance aperture 35.

FIG. 31 is a close-up view of upper control arm 455, which is shown having first and second pins 485 and 490. First pin 485 secures the top portion of carriage link 450 to the upper control arm. Second pin 490 pivotally attaches door 425 to the upper control arm, while third pin 495 attaches the upper control arm to clamp 465. The structure of lower control arm 460 is essentially the same as upper control arm 455.

FIG. 32 shows door 425 having four attachment bushings 520 located on inner surface 525. These bushings may be used to mount the door to the door linkage of sealing mechanism 300. Specifically, each of the four bushings may be pivotally attached to an associated control arm using second pin 490. The inner surface of door 425 may be planar or substantially planar. In some embodiments, the inner surface may be convex to further enhance the contact seal of the inner surface of the door with seal 380. Door 425 may be constructed using any of the door materials discussed above in conjunction with other embodiments.

Referring back to FIGS. 19 thorough 22, operation of sealing mechanism 300 in accordance with an embodiment of the invention will now be described. In FIG. 19, door 425 is in the fully open position, exposing entrance aperture 35. Internal conveyor 40 has positioned baggage 30 within inspection zone 20 of the inspection system. Again, the inspection system may receive baggage 30 from a cooperating baggage transport system, such as a baggage conveyor (not shown in this figure).

In FIG. 20, motor 315 drives lower drive shaft 320 in a first direction, causing belts 325 and 330 to move in a counter-clockwise direction about upper and lower drive shafts 332 and 320. Door 425 is effectively connected to belts 325 and 330 via door linkage components such as upper control arm 455, carriage link 450, and clamp 465. The movement of the belts cause door 425 to move upward, as guided by linear rails 355 and 360. As shown in FIG. 20, the door partially conceals entrance aperture 35. As motor 315 continues to drive the lower drive shaft in this direction, the door will continue to move upward relative to the entrance aperture.

As door 425 nears the end of its travel path, cam 500 engages cam latches 365 on both the right and left sides of the entrance aperture 35, causing the door to move inwardly in addition to its upward motion. Again, the right (partially hidden) side of the entrance aperture includes essentially the same door linkage components as that illustrated on the left side of the entrance aperture. As the door moves inward, a portion of its interior surface contacts seal 380. As each cam 500 fully engages its associated cam latch, the door comes to rest at its upper travel point. The door is now closed, effectively isolating the inspection system 10. Baggage 30 may now be inspected using, for example, any of the various inspection techniques described herein.

Opening of door 425 may be accomplished by essentially reversing the just-described door closing process. For instance, the door may be opened by motor 315 driving lower drive shaft 320 in a second direction, causing belts 325 and 330 to move in a clockwise direction about upper and lower drive shafts 332 and 320. At the initial stages of the opening process, each cam 500 will disengage its associated cam latch 365, in both the right and left side door linkage. At about the same time, the cams will rotate out of their locked position within their respective cam latches, permitting the door to move outward and out of contact with seal 380. The door continues to move downward until the door stops in the open position, as shown in FIG. 19. The inspected baggage 30 may then be removed, and this process repeated for additional baggage items.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed only with reference to the claims.

What is claimed is:

1. An inspection system, comprising:
    a housing having a cavity which defines an inspection zone;
    a positioning device within said inspection zone and providing positioning of a specimen within said inspection zone;
    a sensor system for inspecting said specimen;
    an entrance aperture formed in said housing, said entrance aperture sized to permit said specimen to pass through said entrance aperture;
    a slide mechanism coupled to said housing, and
    a first sealing mechanism cooperating with said positioning device, said first sealing mechanism slidably and operatively coupled to said housing, at least one pivotable attachment coupling said first sealing mechanism to said slide mechanism, said first dealing mechanism selectively positionable between open and closed positions, said open position permitting said specimen to pass through said entrance aperture, and said closed position sealing said entrance aperture to effectively isolate said inspection system, said first sealing mechanism outside housing.

2. The inspection system according to claim 1, wherein said sensor system comprises a nuclear quadrupolar resonance (NQR) sensor.

3. The inspection system according to claim 1, wherein said sensor system comprises an X-ray computed tomography (CT) sensor.

4. The inspection system according to claim 1, wherein said sensor system comprises an X-ray sensor.

5. The inspection system according to claim 1, wherein said sensor system comprises at least one sensor selected from the group consisting of a nuclear magnetic resonance (NMR) sensor, a magnetic resonance imaging (MRI) sensor, a projection X-ray sensor, a single-view X-ray sensor, a multi-view X-ray sensor, a smart X-ray sensor, a chemical trace detection sensor, a millimeter-wave imaging sensor, a terahertz (1 Hz) imaging sensor, a laminagraphy sensor, and a nuclear detection sensor.

6. The inspection system according to claim 1, wherein said sensor system comprises a nuclear quadrupolar resonant (NQR) sensor adapted to detect explosive materials associated with said specimen.

7. The inspection system according to claim 1, wherein said sensor system comprises a nuclear quadrupolar resonant (NQR) sensor adapted to detect contraband present in said specimen.

8. The inspection system according to claim 1, wherein said sensor system comprises a nuclear quadrupolar resonant (NQR) sensor adapted to detect controlled substances present in said specimen.

9. The inspection system according to claim 1, further comprising:
a controller for coordinating operation of said first sealing mechanism and said positioning device.

10. The inspection system according to claim 1, further comprising:
a first transport device for introducing said specimen to said positioning device.

11. The inspection system according to claim 10, wherein said positioning device, and said first transport device each comprise a conveyor.

12. The inspection system according to claim 1, wherein said entrance aperture is formed in a top side of said housing.

13. The inspection system according to claim 1, further comprising:
a lift coupled to said positioning device, said lift selectively positionable permitting said positioning device to receive said specimen.

14. The inspection system according to claim 1, said inspection system further comprising:
a second sealing mechanism cooperating with said positioning device, said second scaling mechanism operatively coupled to said housing and selectively positionable between open and closed positions, said open position permitting said specimen to pass through an exit aperture formed in said housing, and said closed position sealing said exit aperture to effectively isolate said inspection system.

15. The inspection system according to claim 14, further comprising:
a first transport device for introducing said specimen to said positioning device; and
a second transport device for receiving said specimen from said positioning device.

16. The inspection system according to claim 15, further comprising:
a controller for coordinating operation of said first sealing mechanism, said second sealing mechanism, said positioning device, said first transport device, and said second transport device.

17. The inspection system according to claim 14, wherein said positioning device, said first transport device, and said second transport device each comprise a conveyor.

18. The inspection system according to claim 14, further comprising:
a controller for coordinating operation of said first sealing mechanism, said second sealing mechanism, and said positioning device.

19. The inspection system according to claim 14, wherein said entrance aperture is formed in a top side of said housing, and said exit aperture is formed on a front side of said housing, adjacent to said top side.

20. The inspection system according to claim 1, wherein said first sealing mechanism comprises a drive mechanism selected from the group consisting of a pneumatic drive, a hydraulic drive, a magnetic drive, a rail gun, belts, chains, and ropes.

21. The inspection system according to claim 1, wherein said sealing mechanism comprises a door having a plurality of cooperating panels.

22. The inspection system according to claim 1, wherein said sealing mechanism comprises a sliding door.

23. The inspection system according to claim 22, wherein said door is vertically positionable relative to said entrance aperture.

24. The inspection system according to claim 22, wherein said door is horizontally positionable relative to said entrance aperture.

25. The inspection system according to claim 1, wherein said sensor system responds to explosive materials detected during said inspecting of said specimen.

26. The inspection system according to claim 1, wherein said specimen comprises baggage.

27. The inspection system according to claim 1, wherein said specimen comprises a package.

28. The inspection system according to claim 1, wherein said specimen comprises a vehicle.

29. The inspection system according to claim 1 further comprising left and right linear rails, each separately located on opposing sides of said entrance aperture for translating said first sealing mechanism.

30. The inspection system according to claim 1 further comprising a locking mechanism coupled to said housing and configured to enable said first sealing mechanism to contact said housing such that a seal is formed between said first sealing mechanism and said housing.

31. A method for inspecting specimens, comprising:
selectively operating a positioning device located within a housing having a cavity which defines an inspection zone, the housing including a slide mechanism coupled thereto;
selectively operating a first sealing mechanism slidably and operatively coupled to said housing, at least one pivotable attachment coupling the first sealing mechanism to the slide mechanism, said first sealing mechanism outside said housing and being selectively positionable between open and closed positions, said open position permitting a specimen to pass through an entrance aperture and to come into contact with said positioning device, and said closed position sealing said entrance aperture to effectively isolate said inspection system; and
inspecting said specimen for an item of interest after said first sealing mechanism is positioned in said closed position.

32. The method according to claim 31, said method further comprising:
selectively operating a second sealing mechanism operatively coupled to said housing, said second sealing mechanism being selectively positionable between open and closed positions, said open position permitting said specimen to pass through an exit aperture formed in said housing, and said closed position sealing said exit aperture to effectively isolate said inspection system.

33. The method according to claim 31, wherein said item of interest comprises explosives.

34. The method according to claim 31, wherein said item of interest comprises weapons.

35. The method for inspecting specimens according to claim 31 further comprising positioning, separately, left and right linear rails on opposing sides of said entrance aperture for translating said first sealing mechanism.

* * * * *